United States Patent
Siomina

(10) Patent No.: US 9,398,480 B2
(45) Date of Patent: Jul. 19, 2016

(54) METHODS OF OBTAINING MEASUREMENTS IN THE PRESENCE OF STRONG AND/OR HIGHLY VARYING INTERFERENCE

(71) Applicant: Telefonaktiebolaget L M Ericcson (publ), Stockholm (SE)

(72) Inventor: Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 176 days.

(21) Appl. No.: 14/068,817

(22) Filed: Oct. 31, 2013

(65) Prior Publication Data

US 2014/0126403 A1 May 8, 2014

Related U.S. Application Data

(60) Provisional application No. 61/721,787, filed on Nov. 2, 2012.

(51) Int. Cl.
| | |
|---|---|
| *H04W 24/10* | (2009.01) |
| *H04W 52/24* | (2009.01) |
| *H04W 84/04* | (2009.01) |
| *H04J 11/00* | (2006.01) |
| *H04L 1/00* | (2006.01) |
| *H04B 17/318* | (2015.01) |

(52) U.S. Cl.
CPC ............ *H04W 24/10* (2013.01); *H04J 11/005* (2013.01); *H04L 1/0026* (2013.01); *H04W 52/244* (2013.01); *H04B 17/318* (2015.01); *H04W 84/045* (2013.01)

(58) Field of Classification Search
None
See application file for complete search history.

(56) References Cited

U.S. PATENT DOCUMENTS

| | | |
|---|---|---|
| 2008/0220806 A1 | 9/2008 | Shin et al. |
| 2009/0147892 A1* | 6/2009 | Lee et al. ............. 375/346 |

(Continued)

FOREIGN PATENT DOCUMENTS

| | | |
|---|---|---|
| WO | 2011097760 A1 | 8/2011 |
| WO | 2011099910 A1 | 8/2011 |
| WO | 2012067467 A2 | 5/2012 |

OTHER PUBLICATIONS

Author Unknown, "3rd Generation Partnership Project; Technical Specification Group Radio Access Network; Evolved Universal Terrestrial Radio Access (E-UTRA); Requirements for support of radio resource management (Release 11)," Technical Specification 36.133, Version 11.2.0, 3GPP Organizational Partners, Sep. 2012, 672 pages.

(Continued)

*Primary Examiner* — Yemane Mesfin
*Assistant Examiner* — Peter Chen
(74) *Attorney, Agent, or Firm* — Withrow & Terranova, PLLC

(57) ABSTRACT

Systems and methods for obtaining effective measurements in a cellular communications network are disclosed. In one embodiment, a node (i.e., a measuring node) in a cellular communications network performs a reference measurement at the node, where the reference measurement contains one or more interference components. The node then mitigates at least one of the interference components contained in the reference measurement to thereby provide an effective measurement. In one embodiment, the effective measurement is used by the measuring node, reported to another node, or both used by the measuring node and reported to another node.

33 Claims, 10 Drawing Sheets

(56) References Cited

U.S. PATENT DOCUMENTS

| | | | |
|---|---|---|---|
| 2011/0217985 A1 | 9/2011 | Gorokhov | |
| 2011/0281601 A1 | 11/2011 | Ahn et al. | |
| 2012/0082022 A1 | 4/2012 | Damnjanovic et al. | |
| 2012/0082052 A1 | 4/2012 | Oteri et al. | |
| 2012/0113961 A1 | 5/2012 | Krishnamurthy | |
| 2012/0115469 A1 | 5/2012 | Chen et al. | |
| 2012/0122440 A1 | 5/2012 | Krishnamurthy et al. | |
| 2012/0176923 A1* | 7/2012 | Hsu et al. | 370/252 |
| 2012/0213096 A1 | 8/2012 | Krishnamurthy et al. | |
| 2012/0213137 A1 | 8/2012 | Jeong et al. | |
| 2012/0214512 A1 | 8/2012 | Siomina et al. | |
| 2013/0023285 A1 | 1/2013 | Markhovsky et al. | |
| 2013/0094381 A1* | 4/2013 | Han et al. | 370/252 |
| 2013/0225188 A1* | 8/2013 | Seo | H04J 11/005 455/450 |
| 2013/0336149 A1* | 12/2013 | Ishii et al. | 370/252 |
| 2014/0029586 A1 | 1/2014 | Loehr et al. | |
| 2015/0043363 A1* | 2/2015 | Koskinen et al. | 370/252 |

OTHER PUBLICATIONS

Author Unknown, "3rd Generation Partnership Project; Technical Specification Group Radio Access Network; Evolved Universal Terrestrial Radio Access (E-UTRA); Physical Channels and Modulation (Release 11)," Technical Specification 36.211, Version 11.0.0, 3GPP Organizational Partners, Sep. 2012, 106 pages.

Author Unknown, "3rd Generation Partnership Project; Technical Specification Group Radio Access Network; Evolved Universal Terrestrial Radio Access (E-UTRA); Physical layer; Measurements (Release 11)," Technical Specification 36.214, Version 11.0.0, 3GPP Organizational Partners, Sep. 2012, 14 pages.

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.1.0, 3GPP Organizational Partners, Sep. 2012, 325 pages.

Author Unknown, "3rd Generation Partnership Project; Technical Specification Group Radio Access Network; Evolved Universal Terrestrial Radio Access Network (E-UTRAN); X2 application protocol (X2AP) (Release 11)," Technical Specification 36.423, Version 11.2.0, 3GPP Organizational Partners, Sep. 2012, 136 pages.

International Search Report and Written Opinion for PCT/IB2013/059855, mailed Mar. 25, 2014, 10 pages.

International Search Report and Written Opinion for PCT/IB2013/059859, mailed Mar. 25, 2014, 10 pages.

Non-Final Office Action for U.S. Appl. No. 14/068,159, mailed Jul. 7, 2015, 30 pages.

Final Office Action and Examiner-Initiated Interview Summary for U.S. Appl. No. 14/068,159, mailed Dec. 9, 2015, 37 pages.

Advisory Action for U.S. Appl. No. 14/068,159, mailed Feb. 25, 2016, 3 pages.

Non-Final Office Action and Examiner-Initiated Interview Summary for U.S. Appl. No. 14/068,159, mailed Apr. 19, 2016, 36 pages.

* cited by examiner ated Nov. 2, 2012, the dis-
METHODS OF OBTAINING MEASUREMENTS IN THE PRESENCE OF STRONG AND/OR HIGHLY VARYING INTERFERENCE

RELATED APPLICATIONS

This application claims the benefit of provisional patent application Ser. No. 61/721,787, filed Nov. 2, 2012, the disclosure of which is hereby incorporated herein by reference in its entirety.

This application is related to U.S. patent application Ser. No. 14/068,159, entitled METHODS AND DEVICES RELATED TO EFFECTIVE MEASUREMENTS, which was filed Oct. 31, 2013 and is hereby incorporated herein by reference in its entirety.

FIELD OF THE DISCLOSURE

The present disclosure relates to wireless communications networks and in particular to mitigating effects of interference in measurements.

BACKGROUND

With regards to cellular communications networks, interest in deploying low-power nodes (e.g., pico base stations, Home eNodeBs (HeNBs), relays, Remote Radio Heads (RRHs), etc.) for enhancing macro network performance in terms of network coverage, capacity, and service experience of individual users has been constantly increasing over the last few years. At the same time, there is a need for enhanced interference management techniques to address new interference issues resulting from these low-power nodes such as, for example, interference caused by a significant transmit power variation among different cells and interference caused by existing cell association techniques, which were developed for more uniform cellular communications networks.

In $3^{rd}$ Generation Partnership Project (3GPP), heterogeneous network deployments have been defined as deployments where low-power nodes of different transmit powers are placed throughout a macro cell layout. This also implies non-uniform traffic distribution. Heterogeneous network deployments are, for example, effective for capacity extension in certain areas, which are often referred to as traffic hotspots. The traffic hotspots are more specifically small geographical areas with high user density and/or high traffic intensity where installation of low-power nodes can be deployed to enhance performance. Heterogeneous network deployments may also be viewed as a way of densifying networks to adapt for traffic needs and the environment. However, heterogeneous network deployments also bring new challenges for which the cellular communications network has to be prepared to ensure efficient network operation and superior user experience. Some of these challenges are related to increased interference in the attempt to increase small cells associated with low-power nodes, which is known as cell range expansion. Other challenges are related to potentially high interference in the uplink due to a mix of large and small cells.

More specifically, as illustrated in FIG. 1, according to 3GPP, a heterogeneous cellular communications network 10 includes a number of macro, or high-power, base stations 12 forming a macro cell layout and a number of low-power base stations 14 placed throughout the macro cell layout. For Long Term Evolution (LTE), the macro base stations 12 are referred to as Evolved Node Bs (eNBs). The low-power base stations 14 are sometimes referred to as pico base stations (serving pico cells), femto base stations (serving femto cells), HeNBs, or the like. Interference characteristics in a heterogeneous network deployment, such as the heterogeneous cellular communications network 10, for the downlink, uplink, or both the downlink and the uplink can be significantly different than in a homogeneous deployment.

Some examples of new interference scenarios that may be present in the heterogeneous cellular communications network 10 are illustrated in FIG. 1 and are indicated as interference scenarios (A), (B), (C), and (D). In interference scenario (A), a User Equipment (UE) 16 is served by the macro base station 12 and has no access to a nearby Closed Subscriber Group (CSG) cell served by one of the low-power base stations 14. As a result, downlink transmissions by the low-power base station 14 for the CSG cell will result in downlink interference at the UE 16. In interference scenario (B), a UE 18 is served by the macro base station 12 and has no access to a nearby CSG cell served by one of the low-power base stations 14. As a result, uplink transmissions by the UE 18 result in severe uplink interference towards the nearby low-power base station 14. In interference scenario (C), a UE 20 connected to a first CSG cell served by one of the low-power base stations 14 receives downlink interference from another low-power base station 14 serving a second CSG cell. Lastly, in interference scenario (D) a UE 22 is served by a pico cell of one of the low-power base stations 14 and is located in an expanded cell range area (i.e., a Cell Range Expansion (CRE) zone) of the pico cell. In this case, the UE 22 will receive higher downlink interference from the macro base station 12. Note that while CSGs are used in many of the examples above, a heterogeneous network deployment does not necessarily involve CSG cells.

Another challenging interference scenario occurs with cell range expansion. With cell range expansion, the traditional downlink cell assignment rule diverges from the Reference Signal Received Power (RSRP)-based approach, e.g. towards path loss or path gain based approach, e.g. when adopted for cells with a transmit power lower than neighbor cells. The idea of the cell range expansion is illustrated in FIG. 2, which generally illustrates a macro base station 24 and a pico base station 26. As illustrated, cell range expansion of a pico cell served by the pico base station 26 is implemented by means of a delta-parameter. A UE 28 can potentially see a larger pico cell coverage area when the delta-parameter is used in cell selection/reselection. The cell range expansion is limited by the downlink performance since uplink performance typically improves when the cell sizes of neighbor cells become more balanced.

To ensure reliable and high bitrate transmissions as well as robust control channel performance, a good signal quality must be maintained in a cellular communications network. The signal quality of a signal received by a receiver is determined by a received signal strength for the signal and a relation of the received signal strength to a total interference and noise received by the receiver. A good network plan, which among other things also includes cell planning, is a prerequisite for successful network operation. However, the network plan is static. For more efficient radio resource utilization, the network plan has to be complemented by at least semi-static and dynamic radio resource management mechanisms, which are also intended to facilitate interference management, and more advanced antenna technologies and algorithms.

One way to handle interference is to, for example, adopt more advanced transceiver technologies, e.g. by implementing interference cancellation mechanisms in UEs. Another way, which can be complementary to the former, is to design efficient interference coordination algorithms and transmission schemes in the cellular communications network. The coordination may be realized in a static, semi-static, or dynamic fashion. Static or semi-static schemes may rely on reserving time-frequency resources (e.g., a part of the bandwidth and/or time instances) that are orthogonal for strongly interfering transmissions. Dynamic coordination may be implemented by, for example, means of scheduling. Such interference coordination may be implemented for all or specific channels (e.g., data channels or control channels) or signals.

Specifically, for heterogeneous network deployments, enhanced Inter-Cell Interference Coordination (eICIC) mechanisms have been standardized for ensuring that the UE performs at least some measurements (e.g., Radio Resource Management (RRM), Radio Link Management (RLM), and Channel State Information (CSI) measurements) in low-interference subframes of the interfering cell. These mechanisms involve configuring patterns of low-interference subframes at transmitting nodes (and thereby reducing interference) and configuring measurement patterns for UEs (and thereby indicating to the UEs low-interference measurement occasions).

Two types of patterns have been defined for eICIC in LTE Release 10 to enable restricted measurements in the downlink, namely: (1) restricted measurement patterns, which are configured by a network node and signaled to the UE, and (2) transmission patterns (also known as Almost Blank Subframe (ABS) patterns), which are configured by a network node, that describe the transmission activity of a radio node and may be exchanged between radio nodes.

Regarding restricted measurement patterns for the downlink, restricted measurements for RRM (e.g., RSRP/Reference Signal Received Quality (RSRQ)), RLM, CSI, as well as for demodulation are enabled by Radio Resource Control (RRC) UE-specific signaling of the following pattern sets to the UE as specified in 3GPP Technical Specification (TS) 36.331 V10.1.0:

Pattern 1: A single RRM/RLM measurement resource restriction for the serving cell,
Pattern 2: One RRM measurement resource restriction for neighbor cells (up to 32 cells) per frequency (currently only for the serving frequency), and
Pattern 3: Resource restriction for CSI measurement of the serving cell with two subframe subsets configured per UE.

A pattern is a bit string indicating restricted and unrestricted subframes characterized by a length and periodicity, which are different for Frequency Division Duplexing (FDD) and Time Division Duplexing (TDD) (40 subframes for FDD and 20, 60, or 70 subframes for TDD). Restricted measurement subframes are configured to allow the UE to perform measurements in subframes with improved interference conditions, which may be implemented by configuring ABS patterns at the appropriate base stations.

In addition to RRM/RLM, Pattern 1 may also be used to enable UE Receive (Rx)–Transmit (Tx) measurements in low-interference conditions or in principle for any Cell-Specific Reference Signal (CRS)-based measurement to improve the measurement performance when strong interference may be reduced by configuring low-interference subframes. Pattern 3 would typically be used for enhancing channel quality reporting and improving the performance of channel demodulation and decoding (e.g., of data channels such as Physical Downlink Shared Channel (PDSCH) and/or control channels such as Physical Downlink Control Channel (PDCCH), Physical Control Format Indicator Channel (PCFICH), and Physical Hybrid Automatic Repeat Request (HARQ) Indicator Channel (PHICH)). Pattern 1 and Pattern 2 may also be used for enabling low-interference conditions for common signals (e.g., Primary Synchronization Signal (PSS)/Secondary Synchronization Signal (SSS)), common channels, and broadcast/multicast channels (e.g., Physical Broadcast Channel (PBCH)) when strong interference can be reduced or avoided (e.g., when a time shift is applied to ensure that the common channels/signals are interfered with by data transmissions whose interference may be avoided by configuring low-interference subframes and thereby suppressing the interfering data transmissions).

An ABS pattern indicates subframes when a base station restricts its transmissions (e.g., does not schedule transmissions or transmits at a lower power). The subframes with restricted transmissions are referred to as ABS subframes. In the current LTE standard, base stations can suppress data transmissions in ABS subframes, but the ABS subframes cannot be fully blank, i.e., at least some of the control channels and physical signals are still transmitted. Examples of control channels that are transmitted in ABS subframes even when no data is transmitted are PBCH and PHICH. Examples of physical signals that have to be transmitted, regardless of whether the subframes are ABS or not, are CRS and synchronization signals (PSS and SSS). Positioning Reference Signals (PRS) may also be transmitted in ABS subframes. If a Multicast-Broadcast Single-Frequency Network (MBSFN) subframe coincides with an ABS subframe, the subframe is also considered as an ABS subframe, as specified in 3GPP TS 36.423. CRS are not transmitted in MBSFN subframes, except for the first symbol, which allows for avoiding CRS interference from an aggressor cell to the data region of a measured cell. ABS patterns may be exchanged between base stations (e.g., via base station to base station communication, which is referred to as X2 communication in LTE). However, in LTE, the ABS patterns are not signaled to the UE.

In LTE Release 11, for enhanced receivers (e.g., receivers capable of performing an interference handling technique), information about a strongly interfering cell (also known as an aggressor cell) may be provided to facilitate handling of strong interference generated by transmissions in that cell. More specifically, the following information about the interfering cells may be provided to the UE: Physical Cell Identify (PCI), number of CRS antenna ports, and MBSFN subframe configuration. In particular, LTE Release 11 defines the information that may be provided to a UE about an interfering, or aggressor, cell as:

```
NeighCellsCRS-Info-r11 ::=           CHOICE {
    release                              NULL,
    setup                                CRS-
        AssistanceInfoList-r11
}
CRS-AssistanceInfoList-r11 ::= SEQUENCE (SIZE (1..
    maxCellReport)) OF CRS-AssistanceInfo
CRS-AssistanceInfo ::= SEQUENCE {
    physCellId-r11                       PhysCellId,
    antennaPortsCount-r11                ENUMERATED
        {an1, an2, an4, spare1},
    mbsfn-SubframeConfigList-r11         MBSFN-
        SubframeConfigList
}
```

In Universal Mobile Telecommunications System (UMTS)/High Speed Downlink Packet Access (HSDPA), several interference aware receivers have been specified for the UE. These interference aware receivers are referred to as "enhanced receivers" as opposed to the baseline receiver (rake receiver). The UMTS enhanced receivers are referred to as enhanced receiver type 1 (with two branch receiver diversity), enhanced receiver type 2 (with single-branch equalizer), enhanced receiver type 3 (with two branch receiver diversity and equalizer), and enhanced receiver type 3*i* (with two branch receiver diversity and inter-cell interference cancellation capability). The enhanced receivers can be used to improve performance, e.g. in terms of throughput and/or coverage.

In LTE Release 10, enhanced interference coordination techniques have been developed to mitigate potentially high interference, e.g. in a CRE zone, while providing the UE with time-domain measurement restriction information. Further, for LTE Release 11, advanced receivers based on Minimum Mean Square Error-Interference Rejection Combining (MMSE-IRC) with several covariance estimation techniques and interference-cancellation-capable receivers are currently being studied. In the future, even more complex advanced receivers such as advanced receivers based on Minimum Mean Square Error-Successive Interference Cancellation (MMSE-SIC), which is capable of performing nonlinear subtractive-type interference cancellation, may be used to further enhance system performance.

Such enhanced or advanced receiver techniques generally may benefit all deployments where relatively high interference of one or more signals is experienced when performing measurements on radio signals or channels transmitted by radio nodes or devices, but are particularly useful in heterogeneous network deployments. However, these techniques involve additional complexity, e.g., may require more processing power and/or more memory. Due to these factors, a UE equipped with an enhanced or advanced receiver may only use the interference handling technique(s) (i.e., the interference mitigating feature(s)) of the receiver only on specific signals or channels. For example, a UE may apply an interference mitigation or cancellation technique only on the data channel. In another example, a more sophisticated UE may apply interference mitigation on the data channel as well as on one or two common control signals. Examples of common control signals are reference signals, synchronization signals, and the like.

It should be noted that the terms "enhanced receiver" and "advanced receiver" are used interchangeably herein. Further, an enhanced, or advanced, receiver may also be referred to herein as an interference mitigation receiver, an interference cancellation receiver, an interference suppression receiver, an interference rejection receiver, an interference aware receiver, an interference avoidance receiver, or the like. In general, an enhanced, or advanced, receiver is a receiver capable of improving performance by performing one or more interference handling techniques to fully or partly eliminate interference arising from at least one interference source. The interference is generally the strongest interference signal(s) from an interference source(s), where the strongest interference signal(s) are generally interference signal(s) from a neighboring cell(s). Further, the interference handling technique(s) performed by the enhanced, or advanced, receiver may include, for example, interference cancellation, interference suppression, puncturing or interference rejection combining, or the like, or any combination thereof. Hereinafter, the term "enhanced receiver" is utilized to refer to all variants of an enhanced, or advanced, receiver.

In order to measure a quality of a received signal, LTE has standardized the following UE power-based measurements: received signal strength (i.e., RSRP) and quality (i.e., RSRQ), inter-Radio Access Technology (RAT) Universal Terrestrial Radio Access (UTRA) received signal strength and quality, inter-RAT Global System for Mobile Communications (GSM) received signal strength, and inter-RAT Code Division Multiple Access (CDMA) 2000 received signal strength.

The measurements are discussed below in more detail. The RSRQ measurement definition has been additionally adapted in scenarios with high aggressor interference to better reflect interference conditions in subframes indicated for measurements (i.e., when eICIC is used when measurement resource restriction patterns are configured). Currently in LTE, the interference estimated by the UE (e.g., RSSI) is not signaled to the network. However, RSSI may be derived from the reported RSRQ and RSRP measurements, if they have been estimated in the same time intervals.

The measurements described above are typically used for mobility purposes or a Self-Optimizing Network (SON), but the measurements may additionally or alternatively be used for other purposes, e.g., Minimization of Drive Tests (MDT), positioning, inter-cell interference coordination, power control, etc. Also, there are other quality measurements that reflect the received interference conditions, e.g.:

the quality measurement used for RLM as specified in 3GPP TS 36.133: For this quality measurement, the UE monitors the downlink link quality based on a cell-specific or other reference signal in order to detect the downlink radio link quality of the serving or Primary Cell (PCell), wherein the downlink link quality measurement for RLM purposes incorporates signal strength of the measured signal and total received interference;

Signal-to-Interference-Plus-Noise Ratio (SINR) and/or Signal-to-Noise Ratio (SNR); and signal quality measurements in positioning subframes or low-interference subframes such as that described in, for example, PCT Patent Application Publication No. WO 2011/097760 entitled SIGNAL MEASUREMENTS FOR POSITIONING, SIGNALLING MEANS FOR THEIR SUPPORT AND METHODS OF UTILIZING THE MEASUREMENTS TO ENHANCE POSITIONING QUALITY IN LTE, filed Feb. 12, 2010 and published on Aug. 18, 2011 as well as PCT Patent Application Publication No. WO 2011/099910 entitled METHODS AND ARRANGEMENTS FOR PERFORMING MEASUREMENTS IN A WIRELESS COMMUNICATION NETWORK FOR POSITIONING OR FOR ENABLING LOCATION-BASED SERVICES, filed Oct. 6, 2010 and published on Aug. 18, 2011, both of which are hereby incorporated herein by reference with respect to their teachings on signal quality measurements in positioning subframes or low-interference subframes.

In regard to measurements without eICIC, RSRP and RSRQ are two intra-RAT measurements of signal power and quality, respectively. In LTE, RSRP is defined as a linear average over power contributions (in Watts) of resource elements that carry cell-specific reference signals within a considered measurement frequency bandwidth. The cell-specific reference signals R0 according 3GPP TS 36.211 are used for RSRP determination. If the UE can reliably detect that R1 is available, the UE may use R1 in addition to R0 to determine RSRP. The reference point for RSRP measurement is the antenna connector of the UE. If receiver diversity is in use by the UE, the reported RSRP value is not to be lower than the corresponding RSRP of any of the individual diversity branches. The RSRP measurement is applicable for RRC_IDLE intra-frequency, RRC_IDLE inter-frequency, RRC_CONNECTED intra-frequency, and RRC_CONNECTED inter-frequency. Therefore, the UE should be capable of using RSRP in all these RRC states and measurement scenarios.

In LTE, RSRQ is defined as a ratio N×RSRP/(Evolved Universal Terrestrial Radio Access (E-UTRA) carrier RSSI), where N is the number of resource blocks of the E-UTRA carrier Received Signal Strength Indicator (RSSI) measurement bandwidth. The measurements in the numerator and denominator are made over the same set of resource blocks. E-UTRA carrier RSSI comprises a linear average of a total received power (in Watts) observed only in Orthogonal Frequency Division Multiplexing (OFDM) symbols containing reference symbols for antenna port 0 in the measurement bandwidth over a number N of resource blocks by the UE from all sources, including co-channel serving and non-serving cells, adjacent channel interference, thermal noise, etc. The reference point for RSRQ measurements is the antenna connector of the UE. If receiver diversity is in use by the UE, the reported RSRP value is not to be lower than the corresponding RSRQ of any of the individual diversity branches. The RSRP measurement is applicable for RRC_IDLE intra-frequency, RRC_IDLE inter-frequency, RRC_CONNECTED intra-frequency, and RRC_CONNECTED inter-frequency. Therefore, the UE should be capable of using RSRP in all these RRC states and measurement scenarios.

Whereas RSRP and RSRQ are two intra-RAT measurements without eICIC, UTRA FDD Common Pilot Channel (CPICH) Received Signal Code Power (RSCP), UTRA FDD Secondary Pilot Channel (SPICH) Energy per Chip/Noise Spectral Density (Ec/No), GSM carrier RSSI, UTRA TDD Primary Common Control Physical Channel (P-CCPCH) RSCP, CDMA2000 1x Round Trip Time (RTT) Pilot Strength, and CDMA2000 High Rate Packet Data (HRPD) Pilot Strength are inter-RAT measurements without eICIC. More specifically, UTRA FDD CPICH RSCP is the received power on one code measured on the Primary CPICH. The reference point for the RSCP is the antenna connector of the UE. If Tx diversity is applied on the Primary CPICH, the received code power from each antenna is separately measured and summed together in Watts to a total received code power on the Primary CPICH. If receiver diversity is in use by the UE, the reported value is not to be lower than the corresponding CPICH RSCP of any of the individual receive antenna branches. The UTRA FDD CPICH RSCP measurement is applicable for RRC_IDLE inter-RAT and RRC_CONNECTED inter-RAT. Therefore, the UE should be capable of using UTRA FDD CPICH RSCP in all these RRC states and measurement scenarios.

UTRA FDD CPICH Ec/No is the received energy per chip divided by the power density in the band. If receiver diversity is not in use by the UE, the CPICH Ec/No is identical to CPICH RSCP/UTRA Carrier RSSI. Measurement is performed on the Primary CPICH. The reference point for the CPICH Ec/No is the antenna connector of the UE. If Tx diversity is applied on the Primary CPICH, the received energy per chip (Ec) from each antenna is separately measured and summed together in Watts to a total received chip energy per chip on the Primary CPICH, before calculating the Ec/No. If receiver diversity is in use by the UE, the measured CPICH Ec/No value is not to be lower than the corresponding CPICH RSCPi/UTRA Carrier RSSIi of receive antenna branch i. The UTRA FDD CPICH Ec/No measurement is applicable for RRC_IDLE inter-RAT and RRC_CONNECTED inter-RAT. Therefore, the UE should be capable of using UTRA FDD CPICH Ec/No in all these RRC states and measurement scenarios.

GSM carrier RSSI is an RSSI for the wide-band received power within the relevant channel bandwidth. Measurement is performed on a GSM Broadcast Control Channel (BCCH) carrier. The reference point for the RSSI is the antenna connector of the UE. The GSM carrier RSSI measurement is applicable for RRC_IDLE inter-RAT and RRC_CONNECTED inter-RAT. Therefore, the UE should be capable of using GSM carrier RSSI in all these RRC states and measurement scenarios.

UTRA TDD P-CCPCH RSCP is defined as the received power on P-CCPCH of a neighbor UTRA TDD cell. The reference point for the RSCP is the antenna connector of the UE. The UTRA TDD P-CCPCH RSCP measurement is applicable for RRC_IDLE inter-RAT and RRC_CONNECTED inter-RAT. Therefore, the UE should be capable of using UTRA TDD P-CCPCH RSCP in all these RRC states and measurement scenarios.

CDMA2000 1x RTT Pilot Strength is defined in section 5.1.10 of 3GPP TS 36.214. CDMA2000 HRPD Pilot Strength is defined in section 5.1.11 of 3GPP TS 36.214. The CDMA2000 1x RTT Pilot Strength and CDMA2000 HRPD Pilot Strength measurements are applicable for RRC_IDLE inter-RAT and RRC_CONNECTED inter-RAT. Therefore, the UE should be capable of using CDMA2000 1x RTT Pilot Strength and CDMA2000 HRPD Pilot Strength in all these RRC states and measurement scenarios.

The measurements above are made without eICIC. The following measurements are made with eICIC. In the current LTE standard, RSSI measurements with eICIC are averaged over all symbols of a subframe, unlike RSSI measurements without eICIC. Specifically, with eICIC, RSRP is defined as the ratio N×RSRP/(E-UTRA carrier RSSI), where N is the number of resource blocks of the E-UTRA carrier RSSI measurement bandwidth. The measurements in the numerator and denominator are made over the same set of resource blocks. E-UTRA Carrier RSSI comprises the linear average of the total received power (in Watts) observed only in OFDM symbols containing reference symbols for antenna port 0 in the measurement bandwidth over N number of resource blocks by the UE from all sources, including co-channel serving and non-serving cells, adjacent channel interference, thermal noise, etc. With respect to eICIC, if higher-layer signaling indicates certain subframes for performing RSRQ measurements, then RSSI is measured over all OFDM symbols in the indicated subframes. The reference point for the RSRQ is the antenna connector of the UE. If receiver diversity is in use by the UE, the reported value is not to be lower than the corresponding RSRQ of any of the individual diversity branches.

A wideband RSRQ (aka wide bandwidth RSRQ) is similar to the RSRQ described above except that the former (wideband RSRQ) is measured over a measurement bandwidth larger than six resource blocks. That means a wideband RSRQ has to meet requirements corresponding to measurement bandwidth of larger than six resource blocks. The wideband RSRQ is performed by the UE when explicitly indicated by the network, e.g. in some specific deployment scenarios.

The measurements discussed above are generally used for mobility purposes. Other measurements are defined for purposes other than mobility. Some examples are RLM related measurements, CSI measurements, measurements related to signal quality in general, and interference measurements. In regard to RLM related measurements, the UE also performs measurements on the serving cell (or primary cell) in order to monitor the serving cell performance. The performance of these measurements is referred to as RLM, and the measurements are referred herein to as RLM related measurements.

For RLM, the UE monitors the downlink link quality based on the cell-specific reference signal in order to detect the downlink radio link quality of the serving or primary cell. In principle, the downlink link quality can also be monitored also on other types of reference signals, e.g. Demodulation Reference Signal (DMRS), Channel State Information-Reference Signal (CSI-RS), etc. The downlink link quality measurement for RLM purposes incorporates signal strength of the cell-specific reference signal (or any other signal used for measurement) and total received interference. Therefore, RLM measurement is also regarded as a quality measurement.

In order to detect out of sync and in sync conditions, the UE compares the estimated quality with defined thresholds $Q_{out}$ and $Q_{in}$, respectively. The thresholds $Q_{out}$ and $Q_{in}$ are defined as the levels at which the downlink radio link cannot ($Q_{out}$) and can ($Q_{in}$) be reliably received and correspond to 10% and 2% block error rate of a hypothetical PDCCH transmission, respectively. In non-Discontinuous Reception (non-DRX), downlink link quality for out of sync and in sync are estimated over evaluation periods of 200 milliseconds (ms) and 100 ms, respectively. In DRX, downlink link quality for out of sync and in sync are estimated over the same evaluation periods, which scale with the DRX cycle, e.g. a period equal to 20 DRX cycles for DRX cycle greater than 10 ms and up to 40 ms. In non-DRX, the out of sync and in sync statuses are assessed by the UE in every radio frame. In DRX, the out of sync and in sync statuses are assessed by the UE once every DRX.

In addition to filtering on the physical layer (i.e., evaluation period), the UE also applies higher layer filtering based on network configured parameters. This increases the reliability of radio link failure detection and thus avoids unnecessary radio link failure and consequently RRC re-establishment. The higher layer filtering for radio link failure and recovery detection would in general comprise the following network controlled parameters:

hysteresis counters, e.g. N310 and N311 out of sync and in sync counters respectively, and timers, e.g. T310 Radio Link Failure (RLF) timer.

For example the UE starts the timer T310 after N310 consecutive Out-Of-Sync (OOS) detections. The UE stops the timer T310 after N311 consecutive In-Sync (IS) detections. The transmitter power of the UE is turned off within 40 ms after the expiry of the timer T310. Upon expiry of the timer T310, the UE starts the timer T311. Upon expiry of the timer T311, the UE initiates RRC re-establishment phase during which it reselects a new strongest cell. In High Speed Packet Access (HSPA), similar concepts called OOS and IS detection are carried out by the UE. The higher layer filtering parameters (i.e., hysteresis counters and timers) are also used in HSPA. There is also RLF and eventually RRC re-establishment procedures specified in HSPA.

In LTE, CSI measurements are performed and reported by the UE. They are defined to facilitate processes such as, for example, scheduling, link adaptation, selection of antenna transmission mode, etc. CSI measurements are typically performed on CRS that are transmitted in the downlink in every subframe. The network can request both periodic and aperiodic CSI reports from the UE. In LTE Release 8/9, both periodic and aperiodic reports are based on CRS. In LTE Release 10, the CSI report can also be based on CSI-RS, which is used for transmission mode 9. There are three main types of CSI reports in LTE:

Rank Indicator (RI): RI is a recommendation to a base station regarding how many layers in the downlink transmission must be used. The RI is only one value which means that the recommended rank is valid across the whole bandwidth.

Precoder Matrix Indicator (PMI): PMI indicates the recommended precoder matrix that must be used in the downlink transmission. The recommended precoder matrix can be frequency-selective.

Channel Quality Indicator (CQI): CQI shows the highest modulation and coding that can be used for downlink transmission. CQI can be frequency-selective, which means that multiple CQI reports can be sent for different parts of the bandwidth. However, the indication does not explicitly comprise the signal quality metric (e.g., RSRQ).

Regarding signal quality in general, the UE may estimate a signal quality such as SNR, SINR, etc. for various purposes such as for monitoring quality of different physical channels, channel estimation, etc. These measurements are also quality measurements as they incorporate an interference component.

As for interference measurements, currently in LTE, the interference estimated by the UE (e.g., RSSI) is not signaled to the network. However, the interference may be derived from the reported RSRQ and RSRP measurements, if they have been estimated in the same time intervals.

To enhance peak rates within a technology, multi-carrier or carrier aggregation solutions are known. Each carrier in multi-carrier or carrier aggregation system is generally termed as a Component Carrier (CC) or sometimes it is also referred to as a cell. In simple words the CC means an individual carrier in a multi-carrier system. The term Carrier Aggregation (CA) is also called (e.g., interchangeably called) "multi-carrier system," "multi-cell operation," "multi-carrier operation," "multi-carrier" transmission, and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE specific signaling. The PCC exists in both uplink and direction CA. The cellular communications network may assign different primary carriers to different UEs operating in the same sector or cell.

Therefore the UE has more than one serving cell in downlink and/or in the uplink: one primary serving cell and one or more secondary serving cells operating on the PCC and the SCC respectively. The serving cell is interchangeably called as a PCell or Primary Serving Cell (PSC). Similarly the secondary serving cell is interchangeably called a Secondary Cell (SCell) or Secondary Serving Cell (SSC). Regardless of the terminology, the PCell and the SCell(s) enable the UE to receive and/or transmit data. More specifically the PCell and the SCell exist in the downlink and the uplink for the reception and transmission of data by the UE. The remaining non-serving cells on the PCC and SCC are called neighbor cells.

The CCs belonging to the CA may belong to the same frequency band (aka intra-band CA) or to different frequency band (inter-band CA) or any combination thereof (e.g., two CCs in band A and one CC in band B). Furthermore, the CCs in intra-band CA may be adjacent or non-adjacent in frequency domain (aka intra-band non-adjacent CA). A hybrid CA comprising of any two of intra-band adjacent, intra-band non-adjacent, and inter-band is also possible. Using CA between carriers of different technologies is also referred to as "multi-RAT CA" or "multi-RAT-multi-carrier system" or simply "inter-RAT CA." For example, the carriers from Wideband Code Division Multiple Access (WCDMA) and LTE may be aggregated. Another example is the aggregation of LTE FDD and LTE TDD, which may also be interchangeably called a multi-duplex CA system. Yet another example is the aggregation of LTE and CDMA2000 carriers. For the sake of clarity the CA within the same technology as described can be regarded as "intra-RAT" or simply "single RAT" CA.

The CCs in CA may or may not be co-located in the same site or radio network node (e.g., radio base station, relay, mobile relay, etc.). For instance the CCs may originate (i.e., be transmitted/received) at different locations (e.g. from non-located base stations, or from base stations and RRH, or at Remote Radio Units (RRUs)). The well known examples of combined CA and multi-point communication are Distributed Antenna Systems (DAS), RRH, RRU, Coordinated Multi-Point (CoMP), multi-point transmission/reception, etc. The proposed solutions also apply to the multi-point CA systems but also multi-point systems without CA. The multi-carrier operation may also be used in conjunction with multi-antenna transmission. For example signals on each CC may be transmitted by the eNB to the UE over two or more antennas. The embodiments apply to each CC in CA or combination of CA and CoMP scenario.

The use of enhanced receivers and mixtures of enhanced receivers and conventional receivers in a cellular communications network result in new problems associated with some, if not all, of the measurements discussed above. As such, there is a need for systems and methods for addressing these issues.

SUMMARY

The present disclosure relates to effective measurements in a cellular communications network. In one embodiment, a node (i.e., a measuring node) in a cellular communications network performs a reference measurement at the node, where the reference measurement contains one or more interference components. The node then mitigates at least one of the interference components contained in the reference measurement to thereby provide an effective measurement. In one embodiment, the effective measurement is used by the node, reported to another node, or both used by the node and reported to another node.

In one embodiment, the node mitigates the at least one interference component by obtaining a compensation value for mitigating the at least one interference component and applying the compensation value to the reference measurement to thereby provide the effective measurement. In one embodiment, the node is equipped with an enhanced receiver, and the reference measurement is performed while an interference handling technique of the enhanced receiver is disabled. In this embodiment, the compensation value is based on an amount of interference that would have been mitigated by the enhanced receiver had the interference handling technique been enabled while performing the reference measurement. In this manner, the effective measurement is a more accurate representation of a corresponding parameter (e.g., signal quality) at the node.

In one embodiment, the node is equipped with an enhanced receiver capable of mitigating interference at the measuring node such that the one or more interference components contained in the reference measurement are one or more residual interference components. In one particular embodiment, the one or more residual interference components are one or more residual interference components remaining after the enhanced receiver applies an interference handling technique. In another particular embodiment, the enhanced receiver is configured to disable the interference handling technique of the enhanced receiver, and the one or more residual interference components are one or more residual interference components resulting, at least in part, from the disabled interference handling technique. The node then mitigates at least one of the residual interference components contained in the reference measurement to thereby provide the effective measurement.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
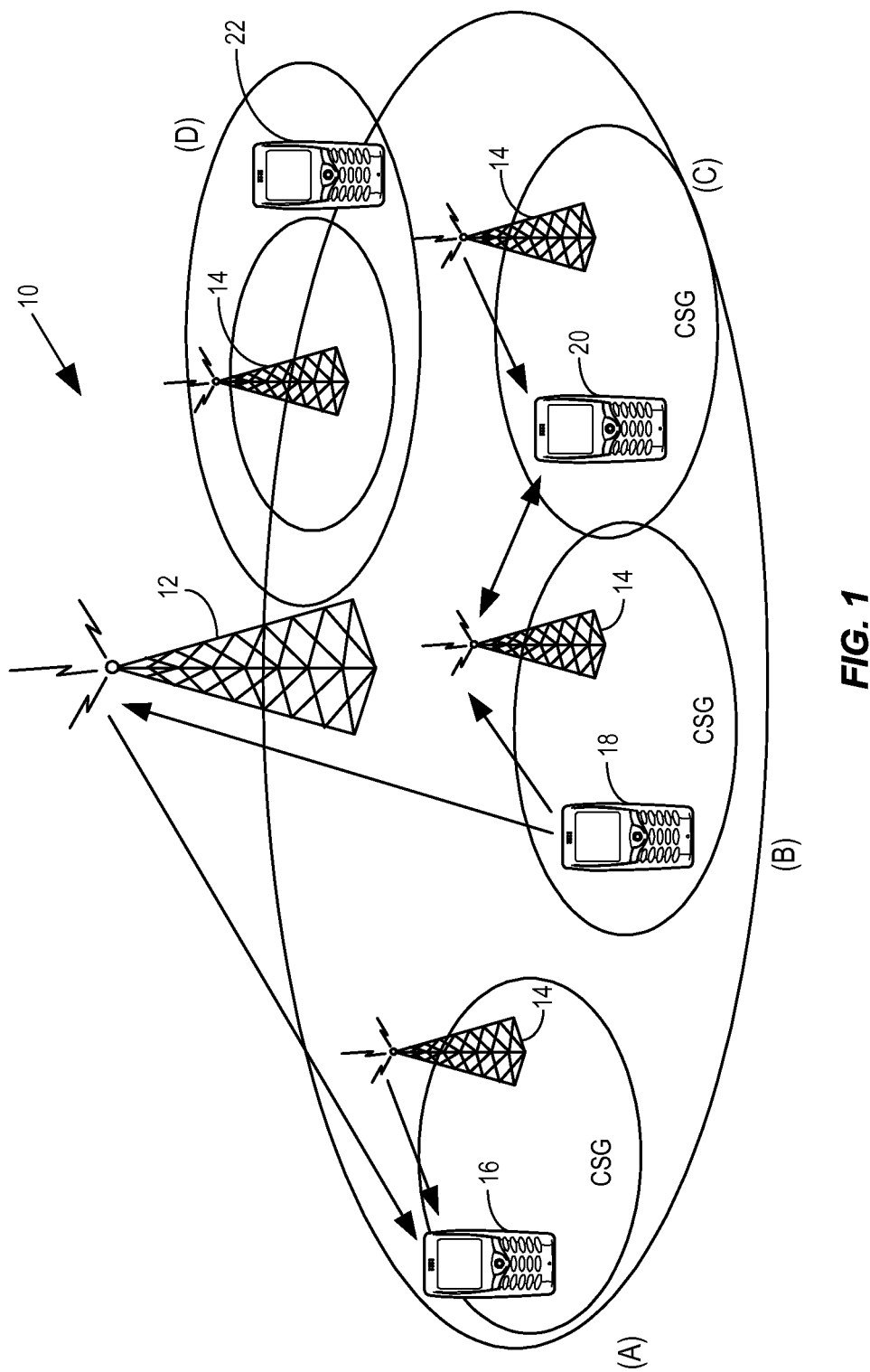
FIG. 1 illustrates a heterogeneous cellular communications network and a number of interference scenarios that may occur in the heterogeneous cellular communications network.
Figure 2:
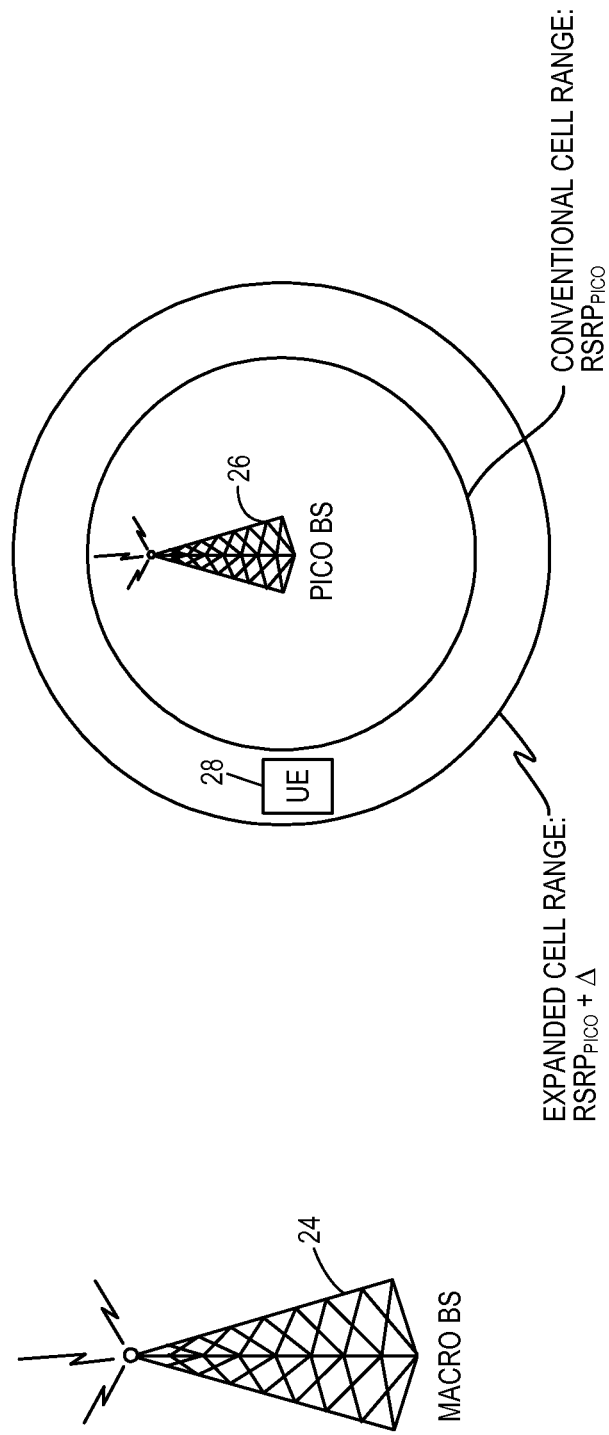
FIG. 2 illustrates cell range expansion of a pico cell in a heterogeneous cellular communications network.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to effective measurements in a cellular communications network. However, before discussing embodiments of the present disclosure, a discussion of some issues relates to measurements in a Long Term Evolution (LTE) cellular communications network may be beneficial. Note, however, that these issues are not to be construed as limiting the scope of the present disclosure. In other words, while certain implementations of the embodiments disclosed herein may be used to address these issues, the present disclosure is not limited thereto.

In general, current measurements in LTE related to interference and signal quality do not accurately account for interference components, e.g., a Reference Signal Received Quality (RSRQ) measurement in the presence of interference from at least one aggressor source. The mismatch between the currently reported measurement and the true signal quality and interference becomes even larger in significantly varying interference conditions which may occur, e.g., due to inter-cell interference coordination and/or configuring low-interference subframes in the network. A significant mismatch may also occur due to using an enhanced receiver at a measuring node (e.g., a wireless device or a User Equipment device (UE)), which applies interference mitigation to improve signal quality, whilst a measurement obtained without interference mitigation may still be reported to the network. The network will then not be aware of the actual effective signal quality at the measuring node.

At least the following problems may arise in the above scenarios. With an enhanced receiver, interference may differ significantly before and after interference handling. Currently, reported measurements do not take into account interference handling, e.g., Received Signal Strength Indicator (RSSI) is calculated before interference handling. The same applies for Radio Link Monitoring (RLM) related measurements. The drawback is that the measuring node (e.g., a wireless device or UE) uses and the network receives pessimistic measurements, rather than the measurements the measuring node actually sees after interference handling. This may degrade the quality of radio link monitoring, handover, pathloss estimation, power control, admission control, congestion control, other Radio Resource Management (RRM) functions, etc., and may lead to higher failure rates, inefficient resource utilization, and worse coordination between a measuring node and a network, e.g. due to a mismatch between measurements used by the UE and measurements reported to the network. This problem may be even more severe when the aggressor interference is strong (enabling more efficient interference mitigation) and/or when there is high interference variation in the network, e.g. due to configuring low-interference subframes (e.g., Almost Blank Subframes (ABSs), positioning subframes, low-interference resources for inter-cell interference coordination enabling full or partial resource reuse in frequency and/or time, etc.) and specific scheduling approaches. Embodiments of the systems and methods disclosed herein can be utilized to address these problems.

Figure 3:
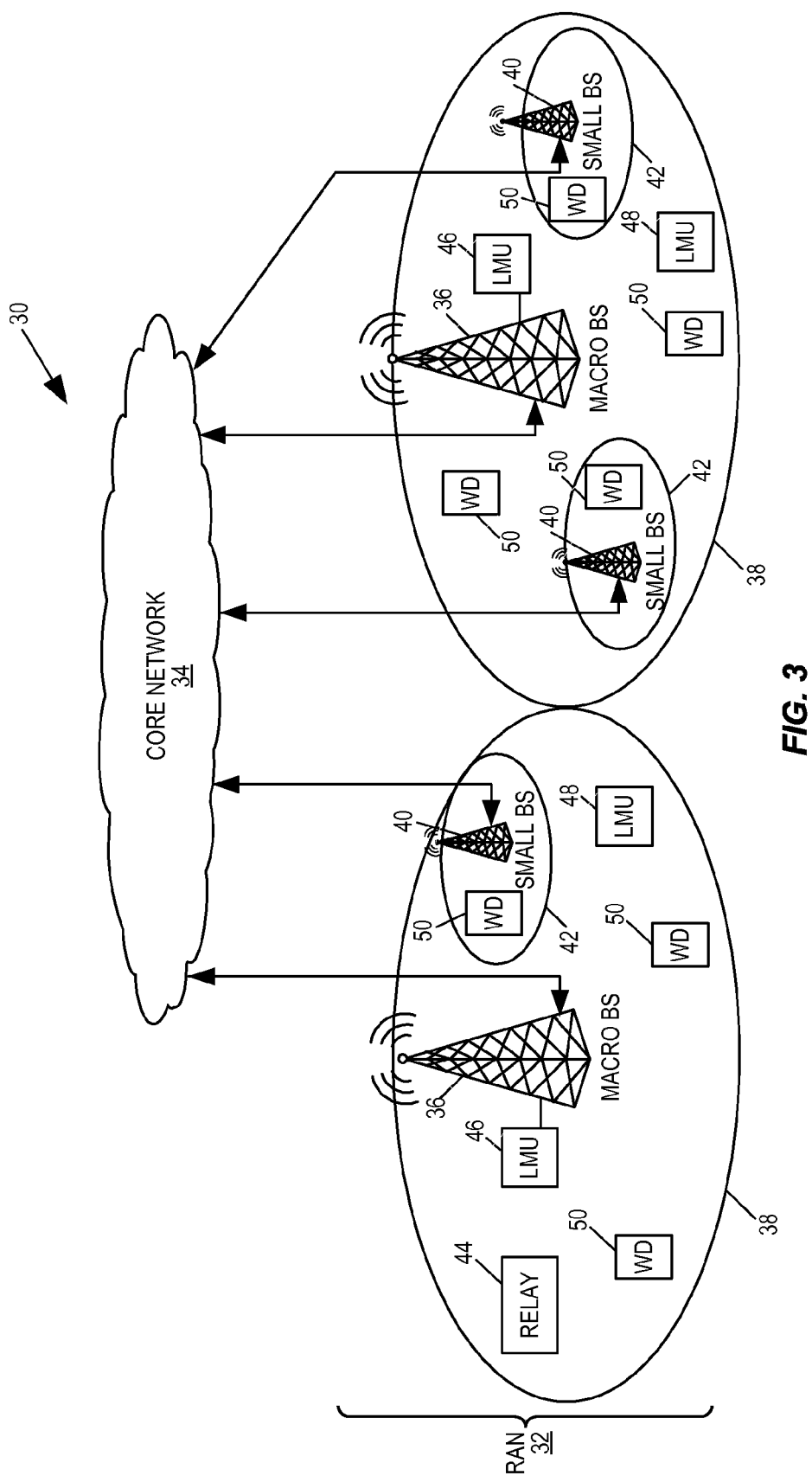
FIG. 3 illustrates a cellular communications network that enables effective measurements (e.g., effective signal quality measurements) according to one embodiment of the present disclosure.

The present disclosure relates to effective measurements in a cellular communications network. Notably, the measurements described herein (i.e., both reference and effective measurements) are radio measurements (e.g., interference or power-based quality measurements). As discussed below, this is particularly beneficial in a cellular communications network having wireless devices or other measuring nodes with enhanced receivers and, even more particularly, in cellular communications networks having wireless devices or other measuring nodes with enhanced receivers where one or more interference handling techniques performed by the enhanced receivers are not always active (e.g., in order to reduce processing and/or power requirements). In this regard, FIG. 3 illustrates a cellular communications network 30 in which effective measurements are generated and used according to one embodiment of the present disclosure. Notably, in one preferred embodiment, the cellular communications network 30 is a $3^{rd}$ Generation Partnership Project (3GPP) LTE or LTE-Advanced network and, as such, 3GPP LTE terminology is sometimes used herein. However, the concepts disclosed herein are not limited to LTE or LTE-Advanced.

As illustrated in FIG. 3, the cellular communications network 30 includes a Radio Access Network (RAN) 32 and a core network 34. The RAN 32 includes a heterogeneous deployment of base stations including a number of macro, or high-power, base stations 36 serving corresponding macro cells 38 and a number of small, or low power, base stations 40 serving corresponding small cells 42. In LTE, the macro base stations 36 are referred to as Evolved Node Bs (eNBs). The small base stations 40 may be referred to as Home eNBs (HeNBs), pico base stations (serving pico cells), femto base stations (serving femto cells), or the like. In general, the small base stations 40 are base stations having a transmit power that is substantially less than that of the macro base stations 36. In this embodiment, the RAN 32 also includes a relay 44, Location Management Units (LMUs) 46 that are either connected to (via a wired connection) or integrated into corresponding macro base stations 36, and stand-alone LMUs 48. The RAN 32 operates to provide wireless access to a number of wireless devices 50 located in the macro cells 38 and the small cells 42. The wireless devices 50 may also be referred to as UEs, mobile terminals, mobile stations, or the like. Some exemplary wireless devices 50 include, but are not limited to, mobile phones, computers equipped with cellular network interfaces, tablet computers equipped with cellular network interfaces, or the like.

The base stations 36, 40 are connected to the core network 34. The core network 34 includes various nodes including, but not limited to, a Mobility Management Entity (MME), a Serving Gateway (S-GW), a Packet Data Network Gateway (P-GW), etc. (not illustrated). The MME is the control-plane node of the core network 34. The MME operates to, among other things, control connection and release of bearers to the wireless devices 50, control IDLE to ACTIVE transitions, and handling of security keys. The S-GW is the user-plane node connecting the core network 34 to the RAN 32. The S-GW operates as a mobility anchor when terminals move between base stations 36, 40 as well as a mobility anchor for other 3GPP technologies (Global System for Mobile Communications (GSM)/General Packet Radio Service (GPRS) and High Speed Packet Access (HSPA)). The P-GW connects the core network 34 to the Internet. In addition, the core network 34 includes other nodes such as, for example, a Policy and Charging Rules Function (PCRF) responsible for Quality-of-Service (QoS) handling and charging, a Home Subscriber Service (HSS) node, which is a database containing subscriber information, and nodes providing a Multimedia Broadcast Multicast Service (MBMS).

Before continuing with the description, a number of terms that are used throughout this description are defined as follows.

As used herein, a "radio node" is characterized by its ability to transmit and/or receive radio signals and it comprises at least one transmitting or receiving antenna. A radio node may be a wireless device or a radio network node.

The terms wireless device and UE are used interchangeably in this description. As used herein, a "wireless device" is any device equipped with a radio interface, or radio subsystem, and capable of at least transmitting or receiving a radio signal from another radio node. A wireless device may also be capable of receiving and demodulating a radio signal. Note that some radio network nodes, e.g., a femto base station (aka a home base station), may also be equipped with a UE-like interface. Some examples of a wireless device that are to be understood in a general sense are a Personal Digital Assistant (PDA), a laptop computer, a mobile phone, a tablet computer or device, a sensor, a fixed relay, a mobile relay, or any radio network node equipped with a UE-like interface.

As used herein, a "radio network node" is a radio node in a radio communications network (e.g., a RAN of a cellular communications network). Thus, a radio network node may be, for example, a base station (e.g., a macro base station, e.g., an eNB, or a low power base station, e.g., a pico, femto, or HeNB), Remote Radio Head (RRH), Remote Radio Unit (RRU), a transmitting-only/receiving-only radio network node, a relay node, or a LMU. A radio network node may be capable of receiving radio signals or transmitting radio signals in one or more frequencies, and may operate in single-Radio Access Technology (inter-RAT), multi-RAT, or multi-standard mode (e.g., Multi-Standard Radio (MSR)). A radio network node may or may not create a corresponding cell. Some examples of radio network nodes not creating their own cells are beacon devices transmitting configured radio signals or measuring nodes receiving and performing measurements on certain signals (e.g., LMUs). A radio network node may also share a cell or cell Identifier (ID) with another radio network node that does create its own cell, operate in a cell sector, or be associated with a radio network node creating its own cell. More than one cell or cell sector (commonly named in the described embodiments by a generalized term "cell" which may be understood as a cell or its logical or geographical part) may be associated with one radio network node. Further, one or more serving cells (in downlink and/or uplink) may be configured for a wireless device, e.g., in a Carrier Aggregation (CA) system where a wireless device may have one Primary Cell (PCell) and one or more Secondary Cells (SCells). A cell may also be a virtual cell (e.g., characterized by a cell ID but not provide a full cell-like service) associated with a transmit node.

As used herein, a "network node" is a radio network node or core network node. Some non-limiting examples of a network node are a base station (also radio network node), Radio Network Controller (RNC), positioning node, MME, Public Safety Answering Point (PSAP), Self-Optimizing Network (SON) node, Minimization of Drive Tests (MDT) node, coordinating node, a gateway node (e.g., P-GW or S-GW or LMU gateway or femto gateway), and an Operation and Management (O&M) node.

The term "coordinating node" used herein is a network node, which coordinates radio resources with one or more radio nodes. Some examples of the coordinating node are a network monitoring and configuration node, Operational Support System (OSS) node, O&M, MDT node, SON node, positioning node, MME, a gateway node such as P-GW or S-GW or femto gateway node, a macro base station coordinating smaller radio nodes associated with it, macro base station coordinating resources with other macro base stations, etc.

The term "subframe" used in the embodiments described herein (typically related to LTE) is an example resource in the time domain, and in general it may be any predefined time instance or time period.

The term "victim" may apply, e.g., to a measured signal or a measured cell (depending on the context), the measurements of which are performed in high-interference conditions. The term "aggressor" may apply, e.g., to a strongly interfering signal or a strongly interfering cell (depending on the context), which is the source of interference the victim. Some examples of victim-aggressor relations are: an LTE physical signal to an LTE physical signal (of the same or different type) or to an LTE physical channel, an LTE physical channel to an LTE physical channel (of the same or different type) or an LTE physical signal, a macro cell or wireless devices served by the macro cell causing interference to a pico cell or a wireless device served by the pico cell, a wireless device served by a femto cell or a Closed Subscriber Group (CSG) causing interference to a non-CSG cell or wireless device served by a non-CSG cell, or the like.

As used herein, an "enhanced receiver" is a receiver capable of performing one or more interference handling techniques (e.g., interference cancellation, interference suppression, interference rejection, etc.). In some embodiments, "receiver type" may be used interchangeably with "receiver technique." Herein, an interference handling/mitigating technique may comprise, e.g., any one or a combination of:

Interference Cancellation (IC), e.g.:
    applied on a physical signal or channel, more specifically, e.g., on Primary Synchronization Signal (PSS), Secondary Synchronization Signal (SSS), Cell-Specific Reference Signal (CRS), Positioning Reference Signal (PRS), Physical Broadcast Channel (PBCH), Physical Downlink Control Channel (PDCCH), or Enhanced PDCCH (ePDCCH), etc.; or
    applied on an antenna or an antenna branch (e.g., cross polarization interference cancellation);
Interference Suppression (IS);
Interference Rejection (IR);
Selective interference filtering; or
Puncturing or using soft weights (e.g., removing or weighting the interference on certain time and/or frequency resources such as subcarriers, resource elements, time-domain symbols, etc.).

As used herein, an "effective measurement" is a measurement accounting for interference and wherein the interference is accounted for by selectively mitigating at least one interference component, e.g., removing or compensating fully or partly some interference components (an interference component is interference that originates from a source of interference, e.g., a node, a signal, or receiver or transmitter imperfection). Some examples of effective measurements are an effective received signal quality measurement (e.g., an effective RSRQ measurement or an effective wideband RSRQ), an effective interference measurement (e.g., an effective RSSI measurement, an effective noise rise measurement, an effective noise floor measurement, or Io (which is the total received power density, including signal and interference, as measured at the UE antenna connector), an effective radio link quality measurement used for RLM, and an effective air interface load measurement. The effective measurement may be intra-frequency, inter-frequency, inter-RAT, CA measurement, etc. and it may be associated with any activity state of a wireless device (e.g., CONNECTED, IDLE, low-activity, low-power consumption, etc.), may be associated with a specific state of a wireless device (e.g., depending on the assistance data availability), or may be avoided or cannot be associated with a specific state (e.g., depending on the power consumption associated with the interference handling technique).

The effective measurement may be associated with a reference measurement. As used herein, a "reference measurement" is a measurement without accounting, and in some embodiments selectively accounting, for interference. Note that the effective measurement may be obtained in a node different from the node performing the reference measurement. The effective measurement may be obtained in a network node (may also be a radio network node), whereas the reference measurement may be obtained in a wireless device, a radio network node, or other measuring node.

Further, the signaling described herein is either via direct links or logical links (e.g., via higher layer protocols and/or via one or more network and/or radio nodes). For example, signaling from a coordinating node to a wireless device may also pass through another network node, e.g., a radio network node.

Also, as noted above, the present disclosure is not limited to LTE or LTE-Advanced. Rather, the concepts and embodiments described herein apply to any RAN, single- or multi-RAT. Some other RAT examples are Universal Mobile Telecommunications System (UMTS), HSPA, GSM, Code Division Multiple Access (CDMA) 2000, WiMAX, and WiFi. In addition, the concepts and embodiments disclosed herein may also be applied to multi-point transmission and/or reception systems, CA systems, and multi-point CA systems.

Currently, interference and power-based signal quality metrics are estimated in LTE including all interference and noise from all sources, including co-channel serving and non-serving cells, adjacent channel interference, thermal noise, etc. A different interference averaging period introduced for Enhanced Inter-Cell Interference Coordination (eICIC) may help, but the obtained measurement may still be very inaccurate. Using the embodiments described herein, effective interference and power-based signal quality measurements that more accurately reflect the conditions that the measuring nodes can be generated.

Figure 4:
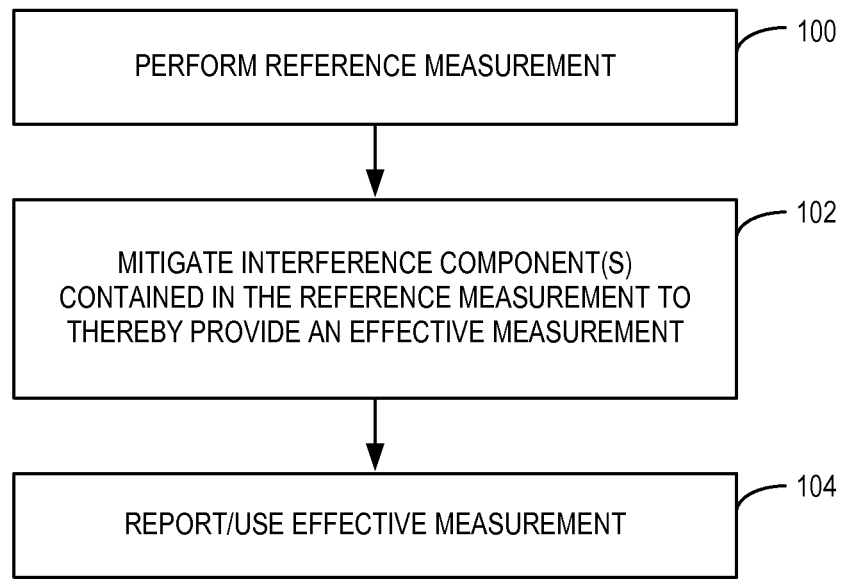
FIG. 4 is a flow chart that illustrates a process for generating an effective measurement and reporting and/or using the effective measurement according to one embodiment of the present disclosure.

Turning now to the operation of the cellular communications network 30 to provide and utilize effective measurements, FIG. 4 illustrates a process for generating and reporting and/or using an effective measurement according to one embodiment of the present disclosure. This process is performed by a measuring node (i.e., a node that performs a reference measurement). The measuring node may be, for example, one of the wireless devices 50, one of the base stations 36, 40, one of the LMUs 46, 48, or some other radio network node. As illustrated, the measuring node first performs a reference measurement (step 100). The reference measurement is preferably an interference or power-based quality measurement (e.g., RSRQ). More specifically, in one embodiment, the measuring node is one of the wireless devices 50, and the reference measurement is, for example, an RSRQ measurement, a wideband RSRQ measurement, a Signal-to-Interference-Plus-Noise Ratio (SINR) measurement, a Signal-to-Noise Ratio (SNR) measurement, some other received signal quality measurement, an RSSI measurement, an air interface load measurement, a noise rise measurement, a Io measurement, a noise floor measurement, a Noc measurement, a Channel Quality Indicator (CQI) measurement, a link quality measurement used for RLM, or some other interference measurement. Noc is defined in 3GPP Technical Specification (TS) 36.133 as the power spectral density of a white noise source (average power per Resource Element (RE) normalized to the subcarrier spacing), simulating interference from cells that are not defined in a test procedure, as measured at the UE antenna connector. Note that this list is only an example, and the reference measurement may alternatively be some other type of measurement. In another embodiment, the measuring node is a radio network node (e.g., base station such as a Node B or eNodeB or an LMU), and the reference measurement is, for example, a received signal quality measurement, an air interface load measurement, a noise rise measurement, a Io measurement, a noise floor measurement, or some other interference measurement. Again, this list is only an example, and the reference measurement may alternatively be some other type of measurement.

The reference measurement contains one or more interference components. The reference measurement is a measurement on one cell (e.g., a serving cell of the measuring node where the measuring node is a wireless device), and the one or more interference components include inter-cell interference from a source(s) in one or more other cells (e.g., a wireless device in a neighboring macro or small cell or a base station of a neighboring macro or small cell). In addition, the one or more interference components may include interference from other sources (e.g., intra-cell interference, thermal noise, images, harmonics, interference due to a CA-capable receiver or CA operation, etc.).

In one embodiment, the measuring node is equipped with an enhanced receiver that is capable of selectively applying one or more interference handling techniques. In particular, the interference handling technique(s) may be activated or deactivated under different conditions in order to, for example, reduce processing and/or power requirements. As such, if the interference handling technique(s) are active, or enabled, when performing the reference measurement, the enhanced receiver fully or partially removes at least some interference components and, as a result, the one or more interference components contained in the reference measurement are one or more residual interference components that were not removed or were only partially removed by the enhanced receiver. Conversely, if the interference handling technique(s) are not active when performing the reference measurement, the one or more residual interference components contained in the reference measurement are all interference components.

As an example, if the measuring node is one of the wireless devices 50 and the reference measurement is a measurement performed on one of the small cells 42, which can be either a serving or neighboring cell of the wireless device 50, the wireless device 50 may receive inter-cell interference from one or more aggressor cells (e.g., interference from one or more of the macro base stations 36). This interference may not be removed or may only be partially removed by an enhanced receiver of the wireless device 50. For instance, the wireless device 50 may not remove interference from reference signals (e.g., CRS, PSS/SSS, etc.) in the RSSI part of an RSRQ measurement. As a result, the RSRQ measurement (i.e., the reference RSRQ measurement) contains one or more interference components.

Thus, the one or more interference components contained in the reference measurement may include, for example, interference caused by:
  a transmission from a specific source, e.g., any one or more of:
    transmission from a different node (e.g., a network node or a wireless device),
    own signal contribution,
    transmission of a specific signal/channel, e.g.:

co-channel interference of one or more signals (e.g., of synchronization signals, CRS, PRS, or PBCH signals from a known aggressor cell), and
interference from a data transmission,
unwanted RF interference, e.g.:
adjacent channel interference,
noise caused by unwanted emissions from another node, and
RF image interference (e.g., in CA),
thermal noise, and/or
at least one transmission in specific time and/or frequency resources (e.g., in certain subframes, time symbols, frequency carrier, subcarriers, resource blocks, part of the bandwidth, resource elements, etc.).

After performing the reference measurement, the measuring node mitigates at least one of the one or more interference components contained in the reference measurement to thereby provide an effective measurement for the measuring node (step 102). In one embodiment, the effective measurement is of the same measurement type as the reference measurement. For example, if the reference measurement is the current LTE RSRQ measurement as defined in LTE Release 9 in 3GPP Technical Specification (TS) 36.214, the effective measurement is then an effective RSRQ measurement.

Interference mitigation may be performed using any suitable technique. As discussed below, in one embodiment, interference mitigation is performed by applying a compensation value(s) to the reference measurement. The interference mitigation partially or fully removes some, if not all, of the interference components contained in the reference measurement. In one embodiment, the interference mitigation partially or fully removes interference component(s) from one or more aggressor cells. In addition, the interference may partially or fully remove any one or more of the remaining interference components (e.g., intra-cell interference, thermal noise, or the like). For example, the measuring node may be one of the wireless devices 50, where the wireless device 50 performs a reference RSRQ measurement on one of the small base stations 40 (e.g., a serving or a neighboring node) and may receive interference from one or more aggressor cells (e.g., a high power node such as one of the macro base stations 36). The wireless device 50 may then mitigate (e.g., remove) interference components from certain physical signals, e.g., synchronization signals, reference signals (e.g., CRS, UE-specific reference signals for another wireless device, etc.) in the RSSI part of the RSRQ measurement.

In one embodiment, the one or more interference components contained in the reference measurement are one or more residual interference components resulting from the performance of the reference measurement when the interference handling technique(s) of the enhanced receiver were disabled. The amount of interference mitigation is then an amount of interference corresponding to a reference level that would have been mitigated by the enhanced receiver if the interference handling technique(s) had been enabled when performing the reference measurement. This decreases the interference in the effective measurement, and as such, the effective measurement is a better representation of the measured parameter (e.g., RSRQ) at the measuring node. Note that if the measuring node is equipped with an enhanced receiver, duplicate interference removal should be avoided (i.e., the measuring node should only mitigate interference components that were not removed or not fully removed by the enhanced receiver of the measuring node).

In one embodiment, the effective measurement may be obtained for, or measured over, a specific bandwidth, e.g., channel bandwidth, measurement bandwidth, a configured bandwidth, a predefined bandwidth, a bandwidth defined by a predefined rule or a standard, over selected set of resource blocks, over selected part of the channel bandwidth (e.g., in the upper 5 Megahertz (MHz) or the lower 5 MHz). Further, the effective measurement may be obtained for, or performed on, a specific physical signal or channel. The effective measurement may be intra-frequency, inter-frequency, inter-RAT (e.g., it may be communicated to another RAT in step 104 discussed below), or intra- or inter-band measurement. The effective measurement may be a downlink or uplink measurement, or Device-to-Device (D2D) measurement.

Once the effective measurement is obtained, the measuring node reports the effective measurement to another node (e.g., a network node in the RAN 32 or another RAN operating according to a different RAT) and/or uses the effective measurement at the measuring node (step 104). Note that step 104 is optional. The effective measurement may then be utilized, at the measuring node and/or some other node, for a desired action or purpose. For instance, the effective measurement or a parameter associated with the effective measurement may be signaled to another node (e.g., to one of the macro base stations 36 or some other network node such as a positioning node, an RNC, or the like). The signaling may be in the same RAT or in a different RAT than the RAT in which the measurement was performed.

The effective measurement may be used in a number of different ways, e.g., for one or more of:
mobility (e.g., handover thresholds), admission/congestion control, or carrier switching in CA (see, e.g., FIG. 6 discussed below),
RLM or radio failure reporting,
inter-cell interference coordination (e.g., ABS configuration, cell transmission or maximum power configuration, deciding the resource split between different transmissions, etc.),
downlink or uplink power control,
load estimation,
downlink or uplink scheduling,
link adaptation,
receiver adaptation,
wireless device power consumption management,
in-device co-existence interference management between a cellular system and in-device external wireless systems (e.g., configuring denial rate and/or denial subframes in which in-device external wireless systems can operate based on the effective measurement),
positioning (e.g., using the effective measurement for Enhanced Cell ID (E-CID), Adaptive Enhanced Cell ID (AECID), Radio Frequency Pattern Matching (RFPM), RF fingerprinting, hybrid positioning, dead reckoning, etc.),
MDT (e.g., using the effective measurement as a part of the MDT report),
SON (e.g., tuning of network parameters), and/or
collecting measurement statistics for observing network performance.

Note that, in this embodiment, both the reference measurement and the effective measurement are made at the measuring node (i.e., the same node). In this case, the receiver of the measuring node may need to adapt (e.g., select the appropriate receiver type, receiver configuration, or receiver algorithm) depending on whether the reference or the effective measurement is performed. Also, the measuring node may need to adaptively decide which measurement is to be reported and when each type of measurement is to be reported.

Figure 5:
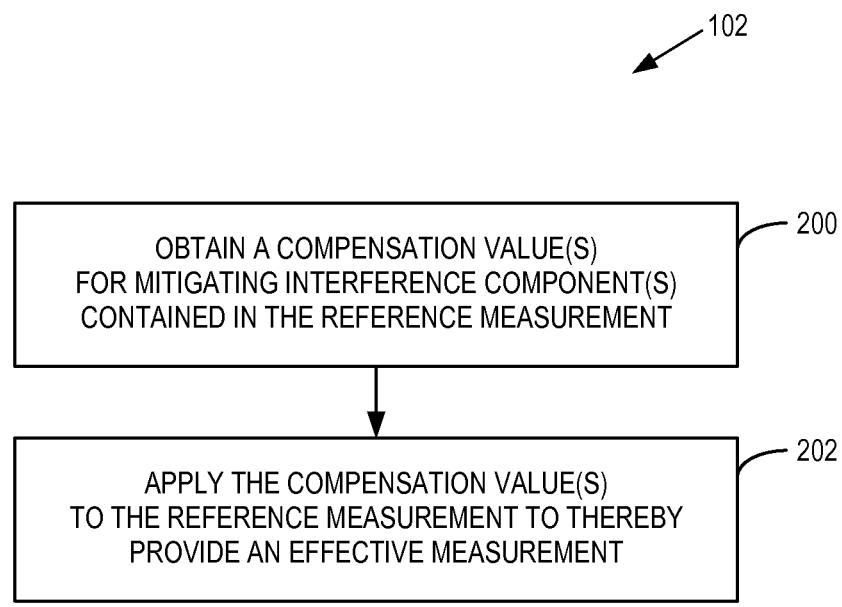
FIG. 5 is a flow chart that illustrates a process for obtaining an effective measurement according to one embodiment of the present disclosure.

FIG. 5 illustrates step 102 of FIG. 4 in more detail according to one embodiment of the present disclosure. As illustrated, in order to mitigate the interference component(s) contained in the reference measurement, the measuring node obtains one or more compensation values for mitigating at least one of the interference components contained in the reference measurement (step 200). The measuring node may obtain the compensation value(s) by determining the compensation value(s) locally at the measuring node or by obtaining the compensation value(s) from another node (e.g., a network node). In one embodiment, the compensation value (s) may be expressed in terms of an amount, or magnitude, of interference that the enhanced receiver of the measuring node could have, but did not, mitigate when performing the reference measurement on a particular type of measuring channel or type of measuring signal. Further, the compensation value (s) may be applied selectively accounting for time and/or frequency resources when the at least one interference component is present in the reference measurement (e.g., when the reference measurement is averaged over a period of time or a number of frequency resources). Alternatively, if the reference measurement is an average over time and/or frequency, the compensation value(s) may be a single compensation value applied to averaged reference measurement.

In another embodiment, the compensation value(s) are value(s) that can be used to fully or partially subtract (or otherwise remove) the at least one interference component from the reference measurement, where the removed interference is associated with a subset of certain (e.g., configured or determined based on interference data and/or measurement configuration data) time and/or frequency resources (e.g., Resource Elements (REs)) to mimic a specific receiver type, e.g. a puncturing receiver applying puncturing on certain resources. In addition or as an alternative to the compensation value(s), an interference handling technique may be used to mitigate the at least one interference component and/or at least one RF configuration parameter of the receiver of the measuring node may be adapted (e.g., a parameter associated with receiver sensitivity or receiver selectivity may be adapted) to mitigate the at least one interference component.

The amount of compensation expressed by the compensation value(s) may be on a linear or logarithmic scale. Further, the amount of compensation expressed by the compensation value(s) may be a scaling factor, 0 decibels (dB), a positive number, a negative number, or the like. The compensation value(s) may include a single compensation value or multiple (i.e., a set) of compensation values (e.g., a set of compensation values including one compensation value per antenna port or stream).

Once the compensation value(s) have been obtained, the measuring node applies the compensation values to the reference measurement to thereby provide the effective measurement (step 202). In one embodiment, the compensation value is such that the compensation value is either subtracted from or added to the reference measurement to obtain the effective measurement. Further, in one embodiment, the compensation value is a single value that is applied (e.g., added to or subtracted from) the reference measurement. In another embodiment, the compensation value(s) include multiple compensation values for different time and/or frequency resources and/or separate compensation values for each antenna port or stream. For instance, multiple compensation values (which may be different values or the same value) may be applied to different time and/or frequency resources (e.g., completely remove interference on a subset of certain REs in a manner similar to a puncturing receiver). Using RSRQ as an example, RSRQ is based on RSSI, which is a linear average of the total received power observed on particular symbols within the measurement bandwidth over N resource blocks. Thus, RSSI consists of a number of sub-measurements of total received power for each observed symbol within the measurement bandwidth over the N resource blocks. Thus, in one embodiment, the compensation value(s) include separate compensation values (which may be same or different values) for each sub-measurement.

Figure 6:
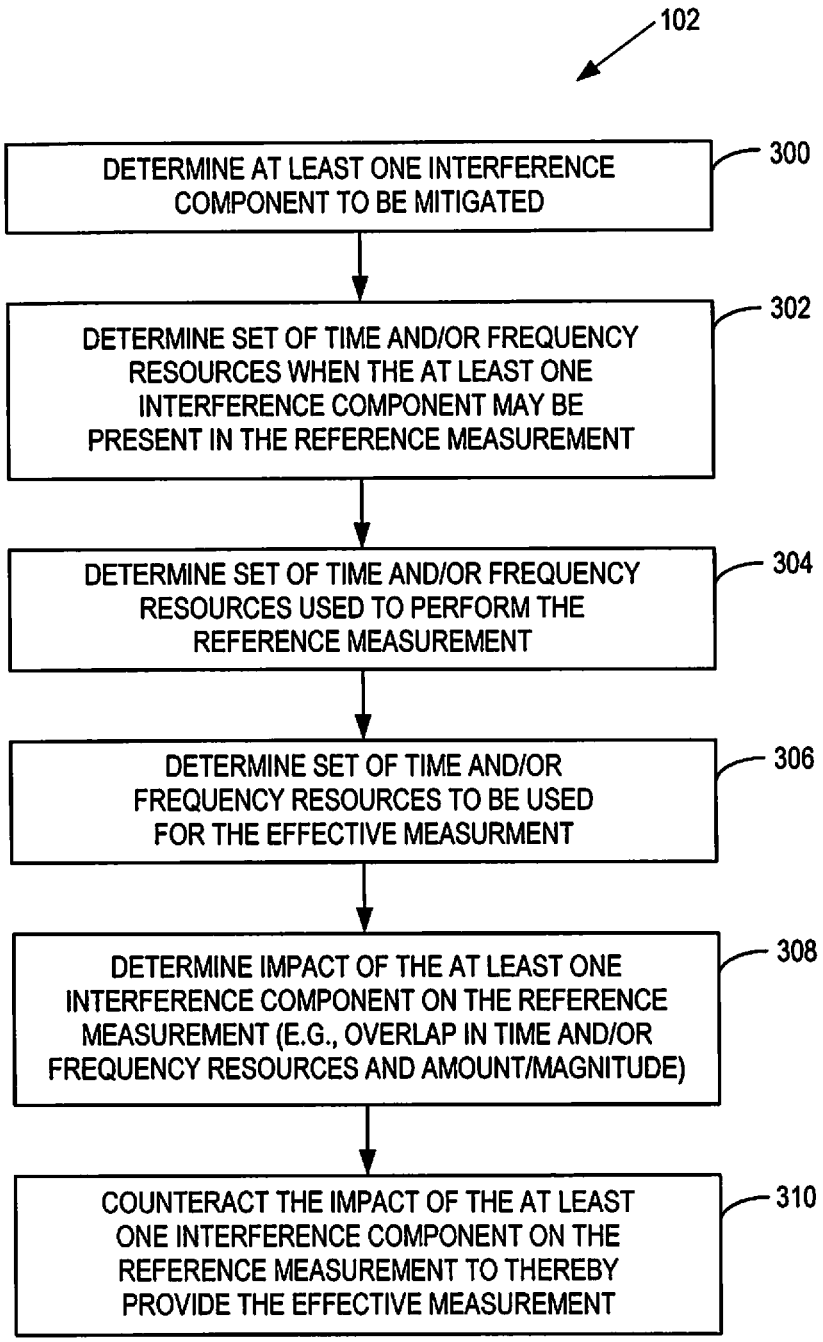
FIG. 6 is a flow chart that illustrates a process for obtaining an effective measurement according to another embodiment of the present disclosure.

FIG. 6 illustrates step 102 of FIG. 4 in more detail according to one embodiment of the present disclosure. Note that the ordering and content of the steps may vary depending on the particular implementation. As illustrated, in order to mitigate the interference component(s) contained in the reference measurement, the measuring node first determines the at least one interference component to be mitigated (step 300). In general, an interference component may be, e.g., a specific cell (e.g., a neighbor cell) or a specific signal (e.g., CRS, PSS/SSS, or PBCH). Thus, determining of the at least one interference component may mean, e.g., determining the strongest interfering cell (e.g., by detection or as indicated in some assistance data from the network) or the type of interfering signals (e.g., based on analyzing whether the interfering signal overlaps or not with the measured signals or data channels of interest being received). The measuring node then determines a set of time and/or frequency resources when the at least one interference component may be present in the reference measurement (step 302). The measuring node also determines a set of time and/or frequency resources used to perform the reference measurement (step 304) as well as a set of time and/or frequency resources to be used for the effective measurement (step 306). The measuring node then determines an impact of the at least one interference component on the reference measurement (step 308). The impact of the at least one interference component on the reference measurement includes time and/or frequency resources that are both in the set of time and/or frequency resources in which the at least one interference component may be present in the reference measurement and the set of time and/or frequency resources used for performing the reference measurement (i.e., the overlap between the sets of time and/or frequency resources determined in steps 302 and 304). The impact may also include the amount (magnitude or severity) of the interference. The amount of the interference may be determined based on other measurements (e.g., Reference Signal Received Power (RSRP) of the aggressor cell(s)), by analyzing interference data (e.g., interfering signal configuration and/or characteristic data) for the at least one interference component, and/or the measurement configuration data associated with the reference and/or effective measurement. Examples of interference data and measurement configuration data are given below in the discussion of FIG. 7.

In one embodiment, determining the impact of the at least one interference component, and in particular determining the amount of interference, includes determining an amount of compensation (i.e., compensation value(s)) by one or more of the following:

using a predefined compensation value (e.g., X dB when the difference between the strongest aggressor signal and measured signal is above Y dB),
selecting a compensation value from a predefined set of compensation values,
obtaining a compensation value by mapping,
obtaining a compensation value from a table,
acquiring a compensation value from internal/external memory,
calculating a compensation value using a predefined rule or using a predefined function, and calculating a compensation value based on collected measurement statistics or historical data (e.g., average or Z percentile of the collected differences between the effective and the reference measurements), The determining of the amount of compensation/removal may also be determined, e.g., based on one or more of:
the method used to obtain the reference measurement, e.g., coherent or non-coherent averaging,
channel characteristics,
measured signal bandwidth (e.g., RSRQ bandwidth or channel bandwidth for the wideband RSRQ),
bandwidth used for interference estimate,
interference handling technique (e.g., whether used or not and which one(s) if so) and receiver type, e.g., interference cancellation capable receiver, puncturing receiver, Interference Rejection Combining (IRC) receiver, interference suppression receiver, CA-capable receiver,
interference conditions (e.g., how much the aggressor cell is stronger than the measured cell, Es/Iot of the measured signal, SNR or Es/Noc of the aggressor cell, SNR or Es/Noc of the measured cell),
Note that Es and Iot are defined in 3GPP TS 36.133 as:
Es: Received energy per RE (power normalized to the subcarrier spacing) during the useful part of the symbol, i.e. excluding the cyclic prefix, at the UE antenna connector, and
Ios: The received power spectral density of the total noise and interference for a certain RE (power integrated over the RE and normalized to the subcarrier spacing) as measured at the UE antenna connector,
number of strong aggressor cells, e.g.:
the number or the set of cells is provided in the assistance data,
a predefined number according to a corresponding requirement,
estimated or predicted number of cells whose signal strength is at least Y dB above the signal strength of the measured cell,
signal strength of interfering signals (e.g., the wireless device may report RSRP of neighbor cells),
CA configuration of the measuring node,
location of the wireless device,
environment type and propagation (e.g., indoor/outdoor, urban/suburban/rural, line of sight/rich multipath, etc.),
derived from another measurement, e.g., from a CQI report,
effective measurement purpose, e.g., mobility, positioning, MDT, SON, etc.,
activity state associated with the effective measurement, wherein the activity state is the activity state (e.g., IDLE) of the node performing the reference measurement, e.g.:
0 dB or a low amount of compensation may be predefined for effective measurements associated with the IDLE state or when the measuring wireless device is in a low activity state, and
Frequency and/or RAT
0 dB or a low amount of compensation may be predefined for inter-frequency or inter-RAT effective measurements.

Lastly, the measuring node counteracts the impact of the at least one interference component on the reference measurement within the time and/or frequency resources to be used for the effective measurement to thereby provide the effective measurement (step 310). In one embodiment, the measuring node does so by applying a single compensation value to the reference measurement, where the single compensation value counteracts the impact of the at least one interference component determined in step 308. In another embodiment, the measuring node counteracts the impact of the at least one interference component by applying the same or different compensation values for the time and/or frequency resources in which the at least one interference component is actually present in the reference measurement (i.e., the overlapping time and/or frequency resources in the sets determined in steps 302 and 304).

As an example, in one embodiment, an effective RSSI measurement and an effective RSRQ measurement can be obtained from a reference measurement containing an interference component from one interfering cell by subtracting the interference resulting from the CRS of the interfering cell as follows. According to 3GPP TS 36.214, the reference RSSI measurement is defined as:

$$RSSI^{ref} = \sum_n w_n \cdot RSSI_n^{ref},$$

where n is a set of symbols consisting of all symbols per subframe with eICIC and only CRS symbols without eICIC, and $w_n$ is a weight factor per symbol. As one non-limiting example, we can assume that:

$$w_n = \frac{1}{N},$$

where N is the number of symbols per subframe included in the reference measurement (e.g., N=14 with eICIC).

The relation between the reference RSSI measurement and the effective RSSI measurement may be expressed as follows:

$$RSSI^{ref} = \frac{1}{N}\sum_n ((\alpha_n - 1) \cdot RSSI_n^{ref} + \alpha_n \cdot (RSSI_n^{eff} + \Delta_n)),$$

where $RSSI^{ref}$ is the reference RSSI measurement, $RSSI_n^{ref}$ is the reference RSSI in symbol n (which is also referred to herein as a sub-measurement of the reference RSSI measurement), $RSSI_n^{eff}$ is the effective RSSI in symbol n, $\alpha_n$ is a factor that controls over which symbols and how the effective RSSI is calculated (e.g., not calculated in symbols n with $\alpha_n=0$), and $\Delta_n$ may be the amount of compensation or the amount of interference that may be subtracted (i.e., the compensation value). The following is also a valid equality:

$$RSSI_n^{ref} = RSSI_n^{eff} + \Delta_n,$$

where $$\Delta_n = \sum_k v_{n,k} \cdot r_{n,k} \cdot I_{n,k},$$

which for the sake of simplicity (similar to the simplification above) may be assumed $$\Delta_n = \frac{1}{K}\sum_k r_{n,k} \cdot RP_{n,k},$$

where $v_{n,k}$ are interference weight factors per subcarrier k in symbol n, k refers to subcarriers where the interfering CRS are present (depends also on the number of CRS antenna ports in the interfering cell), $RP_{n,k}$ is the received interfering signal power in subcarrier k and symbol n (RP may be obtained based on, e.g., RSRP), and $r_{n,k}$ is the factor controlling the subtraction of the interfering signal from the reference measurement to obtain the effective measurement. Full subtraction or puncturing may correspond to, e.g., $r_{n,k}=1$ and a partial interference cancelling may correspond to, e.g., $0<r_{n,k}<1$. No compensation or no interfering signal may be $r_{n,k}=0$.

From the above, the effective RSSI measurement may be obtained, e.g., as follows, $$RSSI_n^{eff} = RSSI_n^{ref} - \Delta_n = RSSI_n^{ref} - \frac{1}{K}\sum_k r_{n,k} \cdot RP_{n,k}, \text{ and}$$

$$RSSI^{eff} =$$

$$\sum_n \alpha_n w_{n\_eff} RSSI_n^{eff} = \sum_n \alpha_n w_{n\_eff} \left( RSSI_n^{ref} - \frac{1}{K}\sum_k r_{n,k} \cdot RP_{n,k} \right)$$

which, under the averaging assumption and when the reference and effective measurements are over the same symbols, may be simplified to:

$$RSSI^{eff} =$$

$$\frac{1}{N}\sum_n RSSI_n^{eff} = \frac{1}{N}\sum_n (RSSI^{ref} - K \cdot r_n \cdot RP) = RSSI^{ref} - \frac{K}{N} \cdot \sum_n r_n \cdot RP$$

where K is the number of carriers with interfering CRS, $r_n$ is the average per RE compensation/cancelling/removal factor (it is zero if interfering CRS is not present in symbol n, otherwise $0<r_n<=1$), and RP is the average per RE received CRS power of the interfering CRS.

The effective RSRQ measurement may be calculated in logarithmic scale as:

$$RSRQ^{eff} = RSRQ^{ref} - RSSI^{ref} + RSSI^{eff},$$

which, if the reference and effective measurements are over the same resources and the weights are the average weights, may be found as, e.g.:

$$RSRQ^{eff} = RSRQ^{ref} - \frac{K}{N}\sum_n r_n RP.$$

In general, for in this example the effective RSRQ measurement may be found as a function:

$$RSRQ^{eff} = f(RSRQ^{ref}, RP, \text{number\_of\_tx\_ports}, \text{number\_of\_symbols}),$$

where the number of Transmit (Tx) ports is the number of antenna ports transmitting an interfering signal which maps to different REs and the number of symbols is a set of symbols for averaging the effective RSRQ. According to one embodiment, the set of symbols for averaging may be for the data region only and/or for the control region only. In another embodiment, it may exclude CRS symbols in the data region. In yet another embodiment, it may or may not include specific symbols, e.g., with synchronization signals of the aggressor and/or measured cell.

Figure 7:
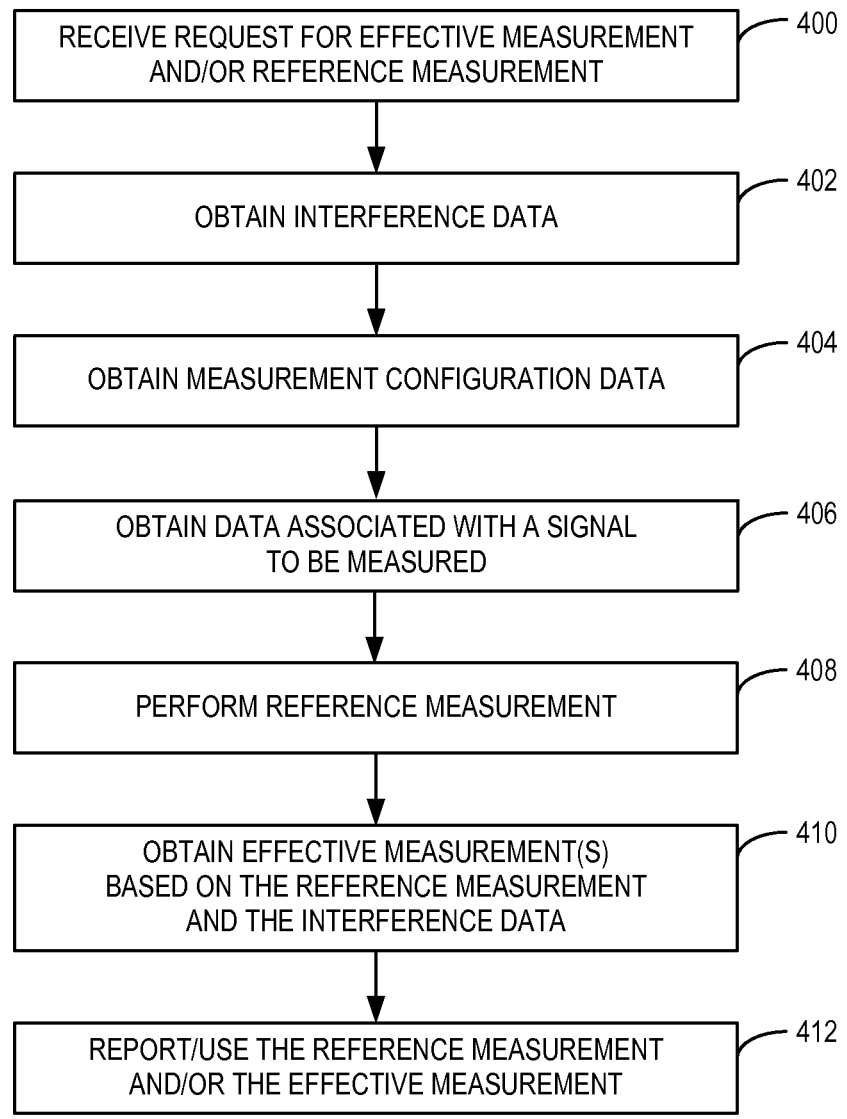
FIG. 7 is a flow chart that illustrates a process for generating an effective measurement and reporting and/or using the effective measurement according to another embodiment of the present disclosure.

FIG. 7 is a flow chart that illustrates a process for generating and reporting and/or using an effective measurement according to another embodiment of the present disclosure. Note that not all steps in the process of FIG. 7 are required (i.e., some are optional) and the order and the content of the steps may differ in different implementations. As illustrated, the measuring node receives a request for an effective measurement and/or a reference measurement (step 400). Step 400 is optional. The measuring node also obtains interference data from another node (step 402). In one embodiment, the interference data is received from a serving base station 36, 40 via, for example, Radio Resource Control (RRC) signaling, from a positioning node via, for example, LTE Positioning Protocol (LPP) or Secure User Plane Location (SUPL), or from another node (e.g., a wireless device 50). The interference data (e.g., interfering signal configuration and/or characteristic data) may describe the interference from one or more sources/signals and may comprise any one or more of:
    transmit power of the interfering signal(s),
    transmit signal configuration of the interfering signal(s) including time and/or frequency resources of the signal transmission(s),
    bandwidth associated with the interfering signal(s) (e.g., channel bandwidth or transmission bandwidth),
    number of transmit ports for the interfering signal(s),
    subframe configuration of the interfering cell(s),
    duplex configuration,
    MBSFN configuration,
    transmit pattern,
    ABS pattern,
    identification of interfering node(s) (e.g., Physical Cell Identities (PCIS) of interfering cell(s)),
    parameters that can be used to regenerate the interfering signal sequence(s) (e.g., PCI for CRS and PRS sequences),
    system information of the interfering cell(s), and
    timing information associated with interfering signal(s) (e.g., System Frame Number (SFN) information of the interfering cell(s), subframe timing, subframe offset with respect to a reference time of the same cell(s) or another cell(s), signal timing, or pattern shift).

Not all of the interference data may be provided in the same message or even using the same protocol. In one specific example, the interference data may include aggressor cell information used in relation to inter-cell interference coordination described above. Some of the interference data may also be obtained based on a predefined rule(s), e.g., about time alignment, power levels, etc., or use default values.

Optionally, the measuring node obtains measurement configuration data associated with the reference measurement and/or the effective measurement (step 404). The measurement configuration data may be obtained from another node (e.g., a serving base station 36, 40). The measurement configuration data may include, for example, one or more of the following:
    measurement time domain and/or frequency domain pattern (in a more specific example, e.g., measurement resource restriction pattern in relation to inter-cell interference coordination described above),
    bandwidth (e.g., configured measurement bandwidth or applicable measurement bandwidth),
    identification of signals or transmitting nodes associated with the signals to be measured (e.g., PCIs of measured cells),
    type of signals to be measured,
    subframe configuration associated with the measured signal, duplex configuration associated with the measured signal, Multicast-Broadcast Single-Frequency Network (MBSFN) configuration associated with the measured signal, measurement gap configuration:

Note that measurement gaps are defined in 3GPP TS 36.133. During measurement gaps, the receiver is tuned to perform measurements on another frequency (i.e., a frequency other than that of the serving cell), in another frequency band (i.e., a frequency band other than that of the serving cell), or in another RAT (i.e., a RAT other than that of the serving cell), or positioning subframe configuration (as specified in 3GPP TS 36.211) or Sounding Reference Signal (SRS) configuration for uplink measurements, The measurement configuration data may be associated with a specific activity state of the receiver of the measuring node (e.g., Discontinuous Reception (DRX), IDLE, power-saving mode, etc.). The measurement configuration data may additionally or alternatively be associated with a specific receiver type of the receiver of the measuring node, e.g., interference cancellation capable receiver, puncturing receiver, IRC receiver, interference suppression receiver, CA-capable receiver, etc. Still further, some of the measurement configuration data may also be obtained based on a predefined rule, e.g., about time alignment, power levels, etc., or use default values.

The measuring node may also optionally obtain data associated with the signal to be measured (step 406). For example, the data associated with the signal to be measured may include timing information or the system information of the cell transmitting the signal(s) to be measured.

The measuring node then performs a reference measurement (step 408). Note that while the measuring node performs the reference measurement in this embodiment, in an alternative embodiment, the reference measurement may be obtained from another node. Notably, the measurement configuration data associated with reference measurement may be used to perform the reference measurement.

The measuring node then obtains one or more effective measurements based on the reference measurement and the interference data (step 410). The measuring node can obtain the effective measurement(s) using, for example, any of the embodiments described herein. Optionally, the measuring node reports and/or uses the reference measurement, the effective measurement(s), or both the reference measurement and the effective measurement(s), as described above (step 412).

Before proceeding, it should be noted that a measuring node may need to comply to one or more predefined requirements and tests. For instance, if the measuring node is one of the wireless devices 50, the wireless device 50 may be required to meet one or more predefined requirements, e.g., measurement time requirement, measurement accuracy requirement, etc.

In one example, accuracy may be defined as a function of any one or more of: interference level, interference variation over different time and/or frequency resources, bandwidth, CA configuration, measurement time, available measurement occasions, total interference level, aggressor interference level, interference characteristics, e.g. how close it is to white noise, etc. Measurement time requirement may be defined as a function of any one or more of: the number of measurement occasions, DRX configuration, number of interferers, number of parallel measurements, usage of measurement gaps or other gaps, etc. The requirements may further depend on the RF capability of the wireless device 50, CA capability of the wireless device 50, measurement capability of the wireless device 50, receiver architecture of the wireless device 50, etc. The requirements may also depend on the measured frequency and/or RAT with respect to the serving frequency and/or RAT (e.g., different requirements for intra-frequency effective measurement, inter-frequency effective measurement, inter-RAT effective measurement, etc.).

For each requirement, the wireless device 50 may have to pass a requirement conformance test to demonstrate that the wireless device 50 is compliant with the requirement. One or more of the embodiments described herein may be utilized by the wireless device 50 to pass the test for a requirement. For example, the wireless device 50 may selectively remove at least one interference component from a reference measurement to provide an effective measurement when a given set of interference data and measurement configuration data are provided and the wireless device operates in certain interference conditions.

Currently there is no bandwidth requirement for RSRQ and RSSI measurement, nor is there any maximum bandwidth restriction. However, obtaining an effective measurement over a large bandwidth may be memory and resource demanding. Hence, in yet another embodiment, a measuring node (e.g., one of the wireless devices 50) capable of obtaining effective measurements may obtain an effective measurement to meet a first set of requirements and perform averaging over a larger set of symbols within a subframe if the measurement bandwidth does not exceed a threshold (e.g., a bandwidth for the wideband RSRQ), while the measuring node may, e.g., use a smaller set of symbols for averaging and/or meeting a second (different) set of requirements or provide the effective measurement in a best effort when the measurement bandwidth is above a threshold. In other words, the ability of a wireless device 50 to obtain the effective measurement may be limited to a certain maximum bandwidth, especially if averaging or filtering over more than one symbol in time (therefore more memory) is needed for calculating the effective measurement. As an example, an exception may be made for wideband RSRQ in the requirements for effective measurements. There may also be a separate capability defined for a UE capable of obtaining an effective measurement (e.g., wideband RSRQ) over a bandwidth above a threshold.

Figure 8:
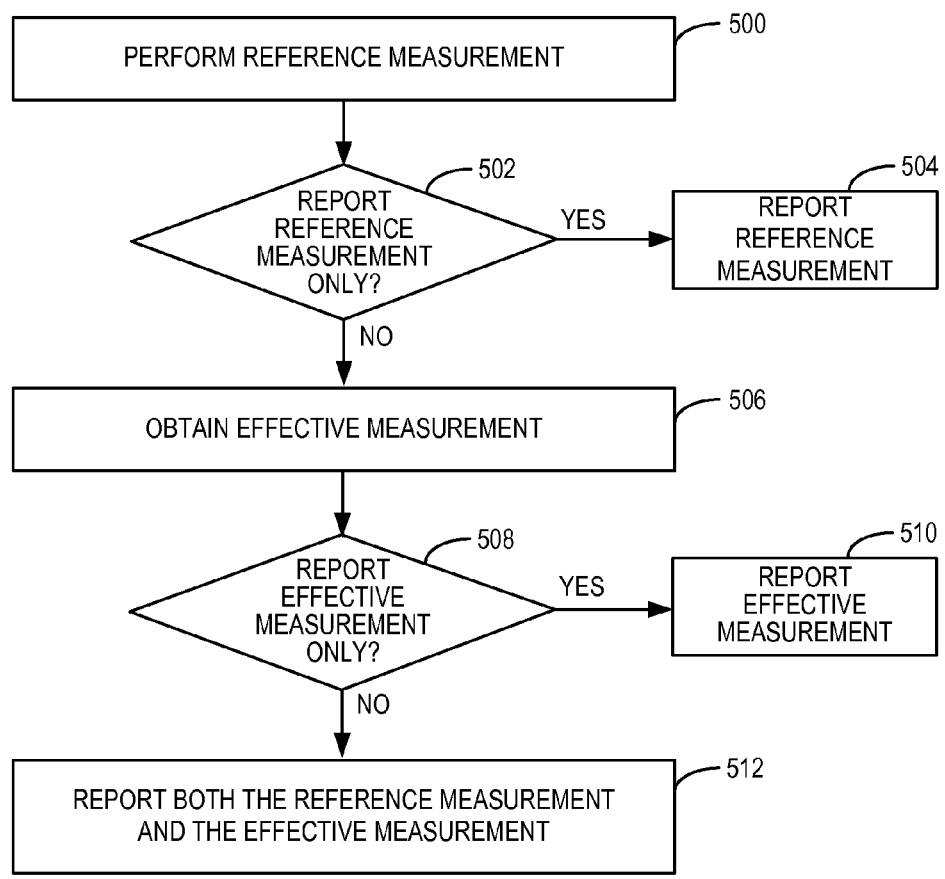
FIG. 8 is a flow chart that illustrates a process for selectively reporting a reference measurement, an effective measurement, or both a reference measurement and an effective measurement according to one embodiment of the present disclosure.

FIG. 8 illustrates an embodiment for selective reporting a reference measurement, an effective measurement, or both an reference measurement and an effective measurement according to one embodiment of the present disclosure. According to this embodiment, a measuring node (which may also be referred to as a reporting node) has the capability of reporting reference measurements and effective measurements. Using the process of FIG. 8, the measuring node adaptively decides which measurement to report and when. Note that while FIG. 8 illustrates a particular ordering of the steps, the steps may be performed in a different order depending on the particular implementation.

As illustrated, the measuring node performs a reference measurement, as described above (step 500). The measuring node then determines whether only the reference measurement is to be reported rather than an effective measurement or both the reference measurement and an effective measurement (step 502). If only the reference measurement is to be reported, the measuring node reports the reference measurement to another node (e.g., a network node) (step 504). The reference measurement may be reported using any appropriate signaling and, for example, as part of a measurement report. If the measuring node determines that the reference measurement is not the only measurement to be reported, the measuring node obtains an effective measurement based on the reference measurement using, for example, any of the embodiments described herein (step 506). The measuring node then determines whether only the effective measurement is to be reported (step 508). If so, the measuring node reports the effective measurement to another node (e.g., a network node) (step 510). The effective measurement may be reported using any appropriate signaling and, for example, as part of a measurement report. If the measuring node determines that the effective measurement is not the only measurement to be reported, the measuring node reports both the reference measurement and the effective measurement (step 512). The reference measurement and the effective measurement may be reported using any appropriate signaling and, for example, as part of a measurement report.

In order for the measuring node to decide (e.g., in steps 502 and 508 of FIG. 8) which of the two measurement types (reference measurement, aka 'first type,' or effective measurement, aka 'second type') are to be reported, or signaled, the measuring node may, for example:

- decide which of the two measurement types to report, or signal, based on interference data or the availability of interference data,
- decide which of the two measurement types to report, or signal, based on measurement configuration data or the availability of measurement configuration data,
- decide to report, or signal, a predefined measurement type,
- decide which of the two measurement types to report, or signal, based on a predefined rule, e.g.:
  - report the reference measurement in a first measurement report type, and report the effective measurement in a second measurement report type,
  - report the reference measurement in response to a first request, and report the effective measurement in response to a second request,
  - report the reference measurement in association with a first set of time and/or frequency resources, and report the effective measurement in association with a second set of time and/or frequency resources, e.g.:
    - the second set of time and/or frequency resources may comprise restricted measurement subframes, or
    - the first set of time and/or frequency resources may comprise a first carrier frequency or Component Carrier (CC), and the second set of time and/or frequency resources may comprise a second frequency or CC,
  - report the reference measurement for a first signal/channel type and the effective measurement for a second signal/channel type, or
  - report the reference measurement for a first type of cells (e.g., macro cells) and the effective measurement for a second type of cells (e.g., low-power nodes),
- decide which of the two measurement types to report, or signal, autonomously,
- decide which of the two measurement types to report, or signal, based upon a triggering event a condition, e.g.:
  - report the effective measurement when the measuring node is in certain interference conditions (e.g., in a Cell Range Expansion (CRE) zone, when the first aggressor signal is X dB above the measured signal or an absolute threshold, or when the reference measurement is below or above a threshold),
- decide which of the two measurement types to report, or signal, based on a purpose of the measurement (i.e., the measurement purpose), e.g.:
  - report the reference measurement and not the effective measurement for mobility purpose or for positioning, or
  - report the effective measurement for RRM purposes or MDT,
- decide which of the two measurement types to report, or signal, based on a battery level or activity state of the measuring node, e.g.:
  - do not report the effective measurement, unless the desired effective measurement is already available, when the battery level is below a threshold or the measuring node is in a low-activity state (e.g., DRX, IDLE, power saving, etc.),
- decide which of the two measurement types to report, or signal, based on configuration received from another node, e.g.:
  - another node may request a specific measurement type (i.e., whether it has to report the first type, the second type, or both) from the measuring node, or
- decide which of the two measurement types to report, or signal, based on any combination of the above.

In another example, the measuring node may report, e.g. both measurement types, e.g.:

- for collecting statistics by the cellular communications network 30 for one or more wireless devices 50 on the differences between the effective and reference measurements in the area, where the statistics may be used, e.g., for predicting the effective measurement (e.g., for predicting ahead in time based on the reference measurement or an earlier effective measurement and/or predicting the effective measurement at a given time when only the reference measurement is only available), or
- for obtaining the data necessary for obtaining a database with compensation factors describing the relationship between the reference and effective measurements, or
- one measurement type and at least one parameter which may be used to determine the other measurement type, e.g., an explicitly signaled compensation factor.

Figure 9:
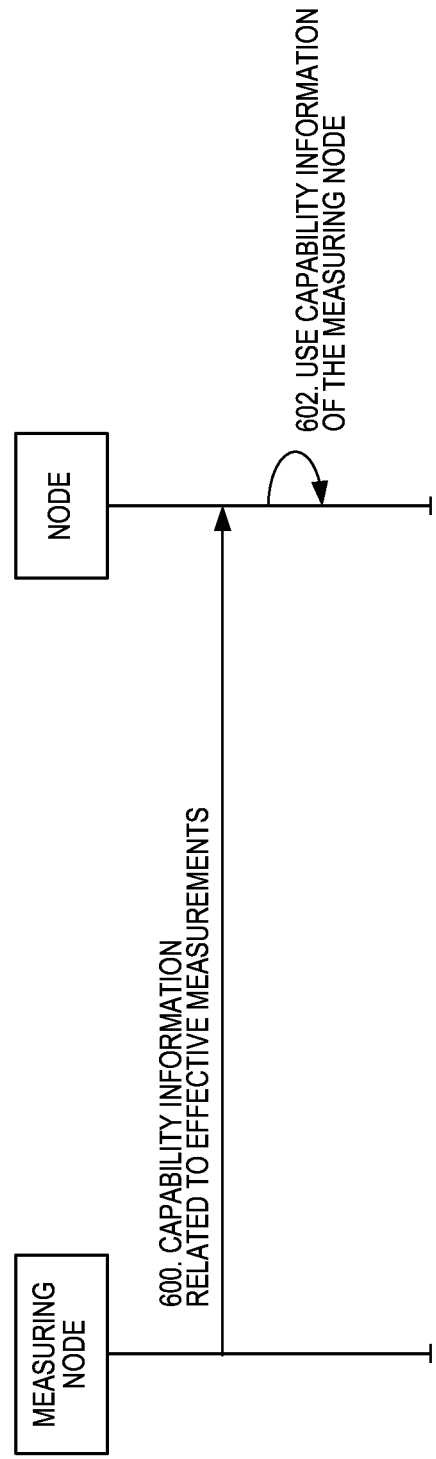
FIG. 9 illustrates a process for exchanging and using capability information related to effective measurements according to one embodiment of the present disclosure.

In some embodiments, it may be desirable for the measuring node to signal its capabilities related to effective measurement to another node. In this regard, FIG. 9 illustrates the operation the measuring node to signal capability information to another node, and the operation of the other node to use the capability information according to one embodiment of the present disclosure. As illustrated, the measuring node sends or signals its capability information to another node (step 600). The other node may be, for example, one of the wireless devices 50 or a network node (e.g., one of the base stations 36, 40). The capability information of the measuring node is information that indicates capabilities of the measuring node related to effective measurements. In one embodiment, the capability information includes one or more of the following:

- information indicative of the capability of the measuring node to receive a request (and interference data) associated with an effective measurement,
- information indicative of the capability of the measuring node to obtain an effective measurement of at least one type or for a certain signal type or for a certain interference type,
- information indicative of the capability of the measuring node to obtain an effective measurement based on a reference measurement (reverse conversion),
- information indicative of the capability of the measuring node to signal an effective measurement to another node, or
- any combination of the above.

The node then uses the capability information of the measuring node (step 602). For example, the node may use the capability information to request or configure different measurements from the measuring node, to adaptively build and provide the assistance data about the interference and/or the measurement configuration data, to ensure that the node is aware that the measuring node is capable of obtaining and/or reporting effective measurements, or to ensure that the reported measurement(s) is(are) an effective measurement(s) and not a reference measurement(s) (e.g., to avoid double compensation in the measuring node and the node). Regarding the assistance data about the interference and/or measurement configuration data, if the node is capable of obtaining effective measurements, then the measuring node may, e.g., be provided with the assistance information which will enable the measuring node to determine one or more interference components such as cell ID of the interfering cell, absolute or relative transmit timing of the interfering components, time and/or frequency resources used by the interfering components, etc.

Figure 10:
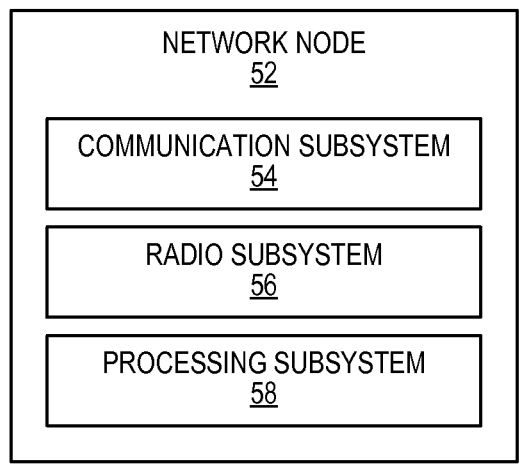
FIG. 10 is a block diagram of a network node in the cellular communications network of FIG. 3 according to one embodiment of the present disclosure.

FIG. 10 is a block diagram of a network node 52 according to one embodiment of the present disclosure. As illustrated, the network node 52 includes a communication subsystem 54, a radio subsystem 56 that includes one or more radio units (not shown), and a processing subsystem 58. The communication subsystem 54 generally includes analog and, in some embodiments, digital components for sending and receiving communications to and from other network nodes. The radio subsystem 56 generally includes analog and, in some embodiments, digital components for wirelessly sending and receiving messages to and from the wireless devices 50. Note that the radio subsystem 56 is not included in all network nodes. For instance, the radio subsystem 56 is included in network nodes in the RAN 32, but is not included in network nodes in the core network 34.

The processing subsystem 58 is implemented in hardware or in a combination of hardware and software. In particular embodiments, the processing subsystem 58 may comprise, for example, one or several general-purpose or special-purpose microprocessors or other microcontrollers programmed with suitable software and/or firmware to carry out some or all of the functionality of the network node 52 described herein. In addition or alternatively, the processing subsystem 58 may comprise various digital hardware blocks (e.g., Application Specific Integrated Circuits (ASICs), one or more off-the-shelf digital and analog hardware components, or a combination thereof) configured to carry out some or all of the functionality of the network node 52 described herein. Additionally, in particular embodiments, the above-described functionality of the network node 52 may be implemented, in whole or in part, by the processing subsystem 58 executing software or other instructions stored on a non-transitory computer-readable medium, such as Random Access Memory (RAM), Read Only Memory (ROM), a magnetic storage device, an optical storage device, or any other suitable type of data storage component.

Figure 11:
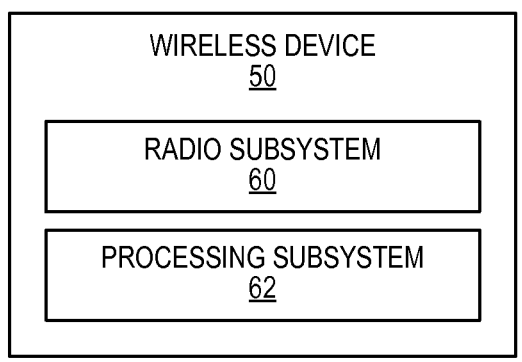
FIG. 11 is a block diagram of one of the wireless devices in the cellular communications network of FIG. 3 according to one embodiment of the present disclosure.

FIG. 11 is a block diagram of one of the wireless devices 50 of FIG. 3 according to one embodiment of the present disclosure. As illustrated, the wireless device 50 includes a radio subsystem 60 that includes one or more radio units (not shown) and a processing subsystem 62. The radio subsystem 60 generally includes analog and, in some embodiments, digital components for wirelessly sending and receiving messages to and from the network nodes in the RAN 32 (e.g., the base stations 36, 40) and, in some embodiments, other wireless devices 50 (e.g., in the case of D2D communication).

The processing subsystem 62 is implemented in hardware or in a combination of hardware and software. In particular embodiments, the processing subsystem 62 may comprise, for example, one or several general-purpose or special-purpose microprocessors or other microcontrollers programmed with suitable software and/or firmware to carry out some or all of the functionality of the wireless device 50 described herein. In addition or alternatively, the processing subsystem 62 may comprise various digital hardware blocks (e.g., one or more ASICs, one or more off-the-shelf digital and analog hardware components, or a combination thereof) configured to carry out some or all of the functionality of the wireless device 50 described herein. Additionally, in particular embodiments, the above-described functionality of the wireless device 50 may be implemented, in whole or in part, by the processing subsystem 62 executing software or other instructions stored on a non-transitory computer-readable medium, such as RAM, ROM, a magnetic storage device, an optical storage device, or any other suitable type of data storage component.

The following acronyms are used throughout this disclosure.

3GPP 3$^{rd}$ Generation Partnership Project
ABS Almost Blank Subframe
AECID Adaptive Enhanced Cell Identifier
ASIC Application Specific Integrated Circuit
BCCH Broadcast Control Channel
CA Carrier Aggregation
CC Component Carrier
CDMA Code Division Multiple Access
CoMP Coordinated Multi-Point
CPICH Common Pilot Channel
CQI Channel Quality Indicator
CRE Cell Range Expansion
CRS Cell-Specific Reference Signal
CSG Closed Subscriber Group
CSI Channel State Information
CSI-RS Channel State Information-Reference Signal
D2D Device-to-Device
DAS Distributed Antenna System
dB Decibel
DMRS Demodulation Reference Signal
DRX Discontinuous Reception
Ec Energy per Chip
E-CID Enhanced Cell Identifier
eICIC Enhanced Inter-Cell Interference Coordination
eNB Evolved Node B
ePDCCH Enhanced Physical Downlink Control Channel
E-UTRA Evolved Universal Terrestrial Radio Access
FDD Frequency Division Duplexing
GPRS General Packet Radio Service
GSM Global System for Mobile Communications
HARQ Hybrid Automatic Repeat Request
HeNB Home Evolved Node B
HRPD High Rate Packet Data
HSDPA High Speed Downlink Packet Access
HSPA High Speed Packet Access
HSS Home Subscriber Service
IC Interference Cancellation
ID Identifier
IR Interference Rejection
IRC Interference Rejection Combining
IS Interference Suppression
LTE Long Term Evolution
LMU Location Measurement Unit
LPP Long Term Evolution Positioning Protocol
MBMS Multimedia Broadcast Multicast Service
MBSFN Multicast-Broadcast Single-Frequency Network
MDT Minimization of Drive Tests
MHz Megahertz
MME Mobility Management Entity MMSE-IRC Minimum Mean Square Error-Interference Rejection Combining
MMSE-SIC Minimum Mean Square Error-Successive Interference Cancellation
ms Microsecond
MSR Multi-Standard Radio
No Noise Spectral Density
O&M Operation and Management
OFDM Orthogonal Frequency Division Multiplexing
OOS Out-Of-Sync
OSS Operational Support System
PBCH Physical Broadcast Channel
PCC Primary Component Carrier
P-CCPCH Primary Common Control Physical Channel
PCell Primary Cell
PCFICH Physical Control Format Indicator Channel
PCI Physical Cell Identity
PCRF Policy and Charging Rules Function
PDA Personal Digital Assistant
PDCCH Physical Downlink Control Channel
PDSCH Physical Downlink Shared Channel
P-GW Packet Data Network Gateway
PHICH Physical Hybrid Automatic Repeat Request Indicator Channel
PMI Precoder Matrix Indicator
PRS Positioning Reference Signal
PSAP Public Safety Answering Point
PSC Primary Serving Cell
PSS Primary Synchronization Signal
QoS Quality of Service
RAM Random Access Memory
RAN Radio Access Network
RAT Radio Access Technology
RE Resource Element
RF Radio Frequency
RFPM Radio Frequency Pattern Matching
RI Rank Indicator
RLF Radio Link Failure
RLM Radio Link Management
RNC Radio Network Controller
ROM Read Only Memory
RRC Radio Resource Control
RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RTT Round Trip Time
Rx Receive
SCC Secondary Component Carrier
SCell Secondary Cell
SFN System Frame Number
S-GW Serving Gateway
SINR Signal-to-Interference-Plus-Noise Ratio
SNR Signal-to-Noise Ratio
SON Self-Optimizing Network
SPICH Secondary Pilot Channel
SRS Sounding Reference Signal
SSC Secondary Serving Cell
SSS Secondary Synchronization Signal
SUPL Secure User Plane Location
TDD Time Division Duplexing
TS Technical Specification
Tx Transmit
UE User Equipment
UMTS Universal Mobile Telecommunications System
UTRA Universal Terrestrial Radio Access
WCDMA Wideband Code Division Multiple Access Those skilled in the art will recognize improvements and modifications to the preferred embodiments of the present disclosure. All such improvements and modifications are considered within the scope of the concepts disclosed herein and the claims that follow.

What is claimed is:

1. A method of operation of a node in a cellular communications network, comprising:
performing a reference measurement at the node, the node being equipped with an enhanced receiver that mitigates interference such that one or more interference components contained in the reference measurement performed by the node are one or more residual interference components, the reference measurement being on a first cell and containing one or more interference components, wherein performing the reference measurement comprises performing a plurality of sub-measurements on a plurality of radio resources;
compensating the reference measurement to mitigate at least one residual interference component of the one or more residual interference components contained in the reference measurement at the node and thereby provide an effective measurement, wherein both the one or more residual interference components contained in the reference measurement and the at least one residual interference component mitigated are comprised in the one or more residual interference components received from at least one second cell, and wherein compensating the reference measurement comprises:
determining a plurality of radio resources in which the at least one residual interference component is present;
determining the plurality of radio resources used for performing the reference measurement;
determining a plurality of radio resources for the effective measurement;
determining an impact of the at least one residual interference component on the reference measurement based on an overlap between the plurality of radio resources in which the at least one residual interference component is present and the plurality of radio resources used for performing the reference measurement; and
counteracting the impact of the at least one residual interference component on the reference measurement within the plurality of radio resources for the effective measurement to thereby provide the effective measurement; and
signaling of the effective measurement to a second node.

2. The method of claim 1 wherein at least two of a bandwidth of the reference measurement, a bandwidth of the effective measurement, and a bandwidth of the at least one interference component are different.

3. The method of claim 1 wherein, prior to the signaling of the effective measurement to the second node, the method further comprises:
receiving, from the second node, a request for the effective measurement.

4. The method of claim 1 wherein signaling the effective measurement comprises selectively signaling the effective measurement to the second node based on a condition.

5. The method of claim 1 wherein the at least one interference component comprises an interference generated by a radio signal transmission by a third node.

6. The method of claim 1 wherein the node is a radio network node in the cellular communications network.

7. The method of claim 1 wherein the node is a wireless device in the cellular communications network.

8. The method of claim 1 wherein counteracting the impact of the at least one interference component on the reference measurement to mitigate the at least one residual interference component contained in the reference measurement comprises:
obtaining at least one compensation value for mitigating the at least one residual interference component contained in the reference measurement; and
applying the at least one compensation value to the reference measurement at the node to provide the effective measurement.

9. The method of claim 8 wherein:
performing the reference measurement comprises performing the reference measurement at the node on the plurality of radio resources when an interference mitigation function of the enhanced receiver is at least partially deactivated such that the one or more residual interference components contained in the reference measurement could have been but were not mitigated by the enhanced receiver; and
obtaining the at least one compensation value comprises determining the at least one compensation value based on a reference value that is indicative of an amount of residual interference that can be mitigated by the enhanced receiver of the node.

10. The method of claim 8 wherein obtaining the at least one compensation value comprises determining the at least one compensation value such that the at least one compensation value at least partially cancels the at least one residual interference component.

11. The method of claim 8 wherein the at least one compensation value is at least one predefined compensation value.

12. The method of claim 8 wherein the at least one compensation value is at least one of a predefined set of compensation values.

13. The method of claim 8 wherein the at least one compensation value is based on a reference value that is indicative of an amount of residual interference that can be mitigated by the enhanced receiver of the node.

14. The method of claim 8 wherein the at least one compensation value is based on one or more previous radio measurements performed by the node.

15. The method of claim 8 wherein the at least one compensation value is based on at least one of a group consisting of: radio measurement statistics for a plurality of previous measurements performed by a plurality of nodes and historical data for a plurality of previous radio measurements performed by a plurality of nodes.

16. The method of claim 8 wherein the at least one compensation value is based on a manner in which the reference radio measurement is performed.

17. The method of claim 8 wherein the at least one compensation value is based on a bandwidth of a signal measured at the node when performing the reference measurement.

18. The method of claim 8 wherein the at least one compensation value is based on a bandwidth for interference estimation.

19. The method of claim 8 wherein the at least one compensation value is based on one or more interference conditions at the node.

20. The method of claim 8 wherein the at least one compensation value is based on information indicative of whether an interference handling technique was used at the node when performing the reference measurement.

21. The method of claim 20 wherein, if one or more interference handling techniques were used at the node when performing the reference measurement, the at least one compensation value is based on information that identifies the one or more interference handling techniques.

22. The method of claim 8 wherein the at least one compensation value is based on a number of aggressor cells at the node.

23. The method of claim 1 wherein:
determining the impact comprises determining a set of radio resources in which the plurality of radio resources in which the at least one residual interference component is present overlap the plurality of radio resources used for performing the reference measurement; and
counteracting the impact comprises:
for each radio resource in the set of radio resources that is within the plurality of radio resources for the effective measurement, subtracting a compensation value from a corresponding one of the plurality of sub-measurements for the reference measurement to thereby provide a compensated sub-measurement; and
providing the effective measurement based on the compensated sub-measurements.

24. The method of claim 1 wherein counteracting the impact of the at least one interference component on the reference measurement to mitigate the at least one residual interference component comprises:
obtaining information indicative of at least one of a group consisting of: a configuration of at least one interfering signal corresponding to the at least one residual interference component and characteristic data for the at least one interfering signal corresponding to the at least one residual interference component; and
compensating the reference measurement to mitigate the at least one residual interference component based on the information.

25. The method of claim 1 wherein the at least one interference component is compensating the reference measurement to mitigate the at least one interference component in such a manner that one or more predefined requirement tests are satisfied.

26. The method of claim 1 further comprising:
signaling capability information to a network node, the capability information being related to a capability of the node to provide effective measurements.

27. The method of claim 26 wherein the capability information comprises at least one of a group consisting of: information indicative of an ability of the node to receive a request associated with an effective measurement, information indicative of an ability of the node to obtain an effective measurement, information indicative of an ability of the node to obtain at least one type of effective measurement, information indicative of an ability of the node to obtain an effective measurement for at least one signal type, information indicative of an ability of the node to obtain an effective measurement by mitigating at least one interference type, and information indicative of an ability of the node to signal an effective measurement to the second node.

28. The method of claim 1 wherein, prior to the signaling of the effective measurement to the second node, the method further comprises:
determining that the effective measurement rather than the reference measurement is to be reported to the second node;

wherein signaling the effective measurement comprises signaling the effective measurement to the second node in response to determining that the effective measurement is to be reported to the second node.

29. The method of claim 28 wherein compensating the reference measurement to mitigate the at least one interference component comprises compensating the reference measurement to mitigate the at least one interference component to thereby provide the effective measurement in response to determining that an effective measurement is to be reported to the second node.

30. The method of claim 28 wherein determining that the effective measurement rather than the reference measurement is to be reported to the second node comprises determining that the effective measurement is to be reported to the second node based on a predefined rule.

31. The method of claim 28 wherein determining that the effective measurement rather than the reference measurement is to be reported to the second node comprises determining that the effective measurement is to be reported to the second node in response to one of a group consisting of: a triggering event and a triggering condition.

32. The method of claim 28 wherein determining that the effective measurement rather than the reference measurement is to be reported to the second node comprises determining that the effective measurement is to be reported to the second node based on a measurement purpose.

33. A node for operation in a cellular communications network, comprising:
- a radio subsystem configured to provide wireless communication in the cellular communications network; and
- a processing subsystem associated with the radio subsystem, the processing subsystem being configured to:
  - perform a reference measurement at the node, the node being equipped with an enhanced receiver that mitigates interference such that one or more interference components contained in the reference measurement performed by the node are one or more residual interference components, the reference measurement being on a first cell and containing one or more interference components, wherein performing the reference measurement comprises performing a plurality of sub-measurements on a plurality of radio resources;
  - compensate the reference measurement to mitigate at least one residual interference component of the one or more residual interference components contained in the reference measurement at the node to thereby provide an effective measurement, wherein both the one or more residual interference components contained in the reference measurement and the at least one residual interference component mitigated are comprised in the one or more residual interference components received from at least one second cell, and wherein compensating the reference measurement comprises:
    - determining a plurality of radio resources in which the at least one residual interference component is present;
    - determining the plurality of radio resources used for performing the reference measurement;
    - determining a plurality of radio resources for the effective measurement;
    - determining an impact of the at least one residual interference component on the reference measurement based on an overlap between the plurality of radio resources in which the at least one residual interference component is present and the plurality of radio resources used for performing the reference measurement; and
    - counteracting the impact of the at least one residual interference component on the reference measurement within the plurality of radio resources for the effective measurement to thereby provide the effective measurement; and
  - signal the effective measurement to another node.

* * * * *